(12) United States Patent
Frank et al.

(10) Patent No.: US 8,694,640 B2
(45) Date of Patent: Apr. 8, 2014

(54) LOW LEVEL STORAGE PROTOCOLS, SYSTEMS AND METHODS

(75) Inventors: Charles Frank, Irvine, CA (US); Thomas Ludwig, San Clemente, CA (US); Thomas Hanan, Mission Viejo, CA (US); William Babbitt, Perris, CA (US)

(73) Assignee: Rateze Remote Mgmt. L.L.C., Wilmington, DE (US)

( * ) Notice: Subject to any disclaimer, the term of this patent is extended or adjusted under 35 U.S.C. 154(b) by 183 days.

(21) Appl. No.: 13/026,093

(22) Filed: Feb. 11, 2011

(65) Prior Publication Data

US 2011/0138057 A1    Jun. 9, 2011

Related U.S. Application Data

(62) Division of application No. 11/344,874, filed on Jan. 31, 2006, now Pat. No. 7,916,727, and a division of application No. 10/473,713, filed as application No. PCT/US02/40205 on Dec. 16, 2002, now Pat. No. 7,602,773.

(60) Provisional application No. 60/425,867, filed on Nov. 12, 2002.

(51) Int. Cl.
*H04L 12/24* (2006.01)

(52) U.S. Cl.
USPC ........... 709/226; 709/217; 709/220; 711/153; 711/170; 711/209

(58) Field of Classification Search
USPC .................. 711/6, 153, 170, 209, 114, 113; 709/220, 217, 226
See application file for complete search history.

(56) References Cited

U.S. PATENT DOCUMENTS

| 5,129,088 | A | | 7/1992 | Auslander | |
|---|---|---|---|---|---|
| 5,193,171 | A | * | 3/1993 | Shinmura et al. | 711/113 |
| 5,546,541 | A | | 8/1996 | Drew | |
| 5,590,276 | A | | 12/1996 | Andrews | |
| 5,592,638 | A | * | 1/1997 | Onodera | 711/6 |
| 5,634,111 | A | | 5/1997 | Oeda | |
| 5,742,604 | A | | 4/1998 | Edsall | |
| 5,758,050 | A | | 5/1998 | Brady | |

(Continued)

FOREIGN PATENT DOCUMENTS

| EP | 0485110 | 5/1992 |
|---|---|---|
| EP | 0654736 | 5/1995 |

(Continued)

OTHER PUBLICATIONS

Office action for Japanese Application No. 2006-224934, mailed Sep. 20, 2011.

(Continued)

*Primary Examiner* — Charles C Jiang
*Assistant Examiner* — Mohamed Kamara
(74) *Attorney, Agent, or Firm* — Schwabe, Williamson & Wyatt, P.C.

(57) ABSTRACT

Communication protocols, systems, and methods that facilitate communication between disaggregated elements, and also to devices adapted to function as such disaggregated elements, particularly across peer-to-peer (masterless) and include one or more unique features such as packet atomicity, blind ACKs, NAT bridging, locking, multicast spanning and mirroring, and authentication.

14 Claims, 11 Drawing Sheets

(56) References Cited

U.S. PATENT DOCUMENTS

| | | | |
|---|---|---|---|
| 5,771,354 A | 6/1998 | Crawford | |
| 5,802,341 A * | 9/1998 | Kline et al. | 711/209 |
| 5,867,686 A | 2/1999 | Conner | |
| 5,889,935 A | 3/1999 | Ofek | |
| 5,930,786 A | 7/1999 | Carino, Jr. | |
| 5,948,062 A | 9/1999 | Tzelnic | |
| 6,018,779 A | 1/2000 | Blumenau | |
| 6,081,879 A | 6/2000 | Arnott | |
| 6,105,122 A | 8/2000 | Muller | |
| 6,157,935 A | 12/2000 | Tran | |
| 6,275,898 B1 | 8/2001 | Dekoning | |
| 6,295,584 B1 | 9/2001 | DeSota | |
| 6,330,615 B1 | 12/2001 | Gioquindo | |
| 6,401,183 B1 | 6/2002 | Rafizadeh | |
| 6,434,683 B1 | 8/2002 | West | |
| 6,442,661 B1 * | 8/2002 | Dreszer | 711/170 |
| 6,449,607 B1 | 9/2002 | Tomita | |
| 6,473,774 B1 | 10/2002 | Cellis | |
| 6,480,934 B1 | 11/2002 | Hino | |
| 6,487,555 B1 | 11/2002 | Bharat | |
| 6,567,863 B1 | 5/2003 | Lafuite | |
| 6,601,101 B1 | 7/2003 | Lee | |
| 6,601,135 B1 | 7/2003 | McBrearty | |
| 6,629,162 B1 | 9/2003 | Arndt | |
| 6,629,264 B1 | 9/2003 | Sicola | |
| 6,636,958 B2 | 10/2003 | Abboud | |
| 6,732,171 B2 | 5/2004 | Hayden | |
| 6,742,034 B1 | 5/2004 | Schubert | |
| 6,772,161 B2 | 8/2004 | Mahalingam | |
| 6,775,672 B2 | 8/2004 | Mahalingam | |
| 6,775,673 B2 | 8/2004 | Mahalingam | |
| 6,799,255 B1 | 9/2004 | Blumenau | |
| 6,834,326 B1 | 12/2004 | Wang | |
| 6,853,382 B1 | 2/2005 | Van Dyke | |
| 6,854,021 B1 | 2/2005 | Schmidt | |
| 6,862,606 B1 | 3/2005 | Major | |
| 6,895,461 B1 | 5/2005 | Thompson | |
| 6,895,485 B1 * | 5/2005 | DeKoning et al. | 711/170 |
| 6,901,497 B2 | 5/2005 | Tashiro | |
| 6,922,688 B1 | 7/2005 | Frey, Jr. | |
| 6,934,799 B2 | 8/2005 | Acharya | |
| 6,977,927 B1 | 12/2005 | Bates | |
| 7,062,648 B2 * | 6/2006 | Moulton et al. | 713/153 |
| 7,069,295 B2 | 6/2006 | Sutherland | |
| 7,072,823 B2 | 7/2006 | Athanas | |
| 7,072,986 B2 | 7/2006 | Kitamura | |
| 7,073,090 B2 | 7/2006 | Yanai | |
| 7,111,303 B2 | 9/2006 | Macchiano | |
| 7,149,769 B2 | 12/2006 | Lubbers | |
| 7,188,194 B1 | 3/2007 | Kuik | |
| 7,200,641 B1 | 4/2007 | Throop | |
| 7,203,730 B1 | 4/2007 | Meyer | |
| 7,243,144 B2 | 7/2007 | Miyake | |
| 7,254,620 B2 | 8/2007 | Iwamura | |
| 7,263,108 B2 | 8/2007 | Kizhepat | |
| 7,278,142 B2 | 10/2007 | Bandhole | |
| 7,428,584 B2 | 9/2008 | Yamamoto | |
| 7,475,124 B2 | 1/2009 | Jiang | |
| 2001/0037371 A1 | 11/2001 | Ohran | |
| 2002/0026558 A1 | 2/2002 | Reuter | |
| 2002/0029286 A1 | 3/2002 | Gioquindo | |
| 2002/0062387 A1 | 5/2002 | Yatziv | |
| 2002/0133539 A1 | 9/2002 | Monday | |
| 2002/0165978 A1 | 11/2002 | Chui | |
| 2002/0194428 A1 * | 12/2002 | Green | 711/114 |
| 2003/0023811 A1 | 1/2003 | Kim | |
| 2003/0065733 A1 | 4/2003 | Pecone | |
| 2003/0093567 A1 | 5/2003 | Lolayekar | |
| 2003/0118053 A1 | 6/2003 | Edsall | |
| 2003/0130986 A1 | 7/2003 | Tamer | |
| 2003/0172157 A1 | 9/2003 | Wright | |
| 2003/0202510 A1 | 10/2003 | Witkowski | |
| 2004/0019655 A1 * | 1/2004 | Uemura et al. | 709/217 |
| 2004/0088293 A1 | 5/2004 | Daggett | |
| 2004/0181476 A1 | 9/2004 | Smith | |
| 2004/0215749 A1 * | 10/2004 | Tsao | 709/220 |
| 2005/0114350 A1 * | 5/2005 | Rose et al. | 707/10 |
| 2005/0144199 A2 | 6/2005 | Hayden | |
| 2005/0166022 A1 | 7/2005 | Watanabe | |
| 2005/0270856 A1 | 12/2005 | Earhart | |
| 2006/0036602 A1 | 2/2006 | Unangst | |

FOREIGN PATENT DOCUMENTS

| | | |
|---|---|---|
| EP | 0700231 | 3/1996 |
| EP | 0706113 | 4/1996 |
| JP | 05-265914 | 10/1993 |
| JP | 2002318725 | 10/2002 |
| JP | 2004045728 | 2/2004 |
| WO | 0215018 | 2/2002 |
| WO | 02/071775 | 9/2002 |

OTHER PUBLICATIONS

International Preliminary Examination Report for PCT/US02/40205, mailed Feb. 2, 2004.
International Preliminary Examination Report for PCT/US02/40205, mailed Nov. 18, 2004.
International Search Report for PCT/US02/40205, mailed May 12, 2003.
Written Opinion for PCT/US02/40205, mailed Nov. 12, 2003.
Office action for Chinese Application No. 02829873.X, mailed Jan. 26, 2007.
Office action for Chinese Application No. 02829873.X, mailed Jul. 27, 2007.
Final Office action for Japanese Application No. 2004-551383, mailed May 23, 2006.
Office action for Japanese Application No. 2004-551383, mailed Jan. 17, 2006.
Office action for Japanese Application No. 2004-551383, mailed Aug. 16, 2005.
Office action for European Application No. 02808140.4, mailed Aug. 17, 2005.
Office action for European Application No. 02808140.4, mailed Nov. 28, 2005.
Office action for European Application No. 06016115.5, mailed Sep. 23, 2008.
Search Report for European Application No. 06016115.5, mailed Sep. 14, 2006.
Final Office action for U.S. Appl. No. 10/473,713, mailed Oct. 9, 2008.
Notice of Allowance for U.S. Appl. No. 10/473,713, mailed Jun. 3, 2009.
Notice of Allowance for U.S. Appl. No. 10/473,713, mailed Dec. 30, 2008.
Office action for U.S. Appl. No. 10/473,713, mailed Apr. 28, 2008.
Office action for U.S. Appl. No. 10/473,713, mailed Dec. 10, 2007.
Final Office action for U.S. Appl. No. 11/344,874, mailed Jul. 27, 2009.
Notice of Allowance for U.S. Appl. No. 11/344,874, mailed Nov. 17, 2010.
Office action for U.S. Appl. No. 11/344,874, mailed Jan. 27, 2010.
Office action for U.S. Appl. No. 11/344,874, mailed Jun. 10, 2010.
Office action for U.S. Appl. No. 11/344,874, mailed Sep. 28, 2009.
Office action for U.S. Appl. No. 11/344,874, mailed Nov. 28, 2008.
Supplemental Notice of Allowance for U.S. Appl. No. 11/344,874, mailed Dec. 23, 2010.
Anderson, et al., "Serverless Network File Systems," In Proceedings of the 15th Symposium on Operating Systems Principles, Dec. 1995.
Beck, Micah, et al., An End-to-End Approach for Globally Scalable network Storage, ACM SIGCOMM Computer Communication Review; vol. 32, Issue 4, Proceedings of the 2002 SIGCOMM Conference; pp. 339-346; Oct. 2002.
Gibson, Garth; A Cost Effective High-Bandwidth Storage Architecture; ACM SIGOPS Operating Systems Review, col. 32, issue 5, pp. 92-103; 1998.
Gibson, Garth; File Server Scaling with Network-Attached Secure Disks; Joint Int'l Conference on Measurement & Modeling of Com-

(56) References Cited

OTHER PUBLICATIONS puter Systems Proceedings of the 1997 ACM SIGMETRICS Int'l Conference on Measurement & Modeling of Computer Systems; pp. 272-284; 1997.

Lee, et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, pp. 84-92, XP000681711, ISBN: 0-89791-767-7, Oct. 1, 1996.

Satran et al., "Internet Small Computer Systems Interface (iSCSI)" Internet Draft draft-ietf-ips-iscsi-19.txt, Nov. 3, 2002.

Satran et al. "Internet Small Computer Systems Interface (iSCSI)" IETF Standard, Internet Engineering Task Force, IETF, CH, XP015009500, ISSN: 000-0003, Apr. 2004.

\* cited by examiner

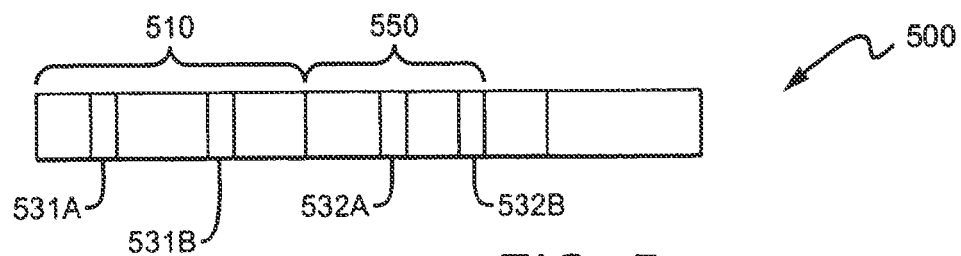
FIG. 5
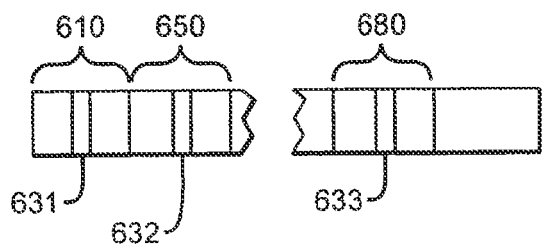
FIG. 6
FIG. 7
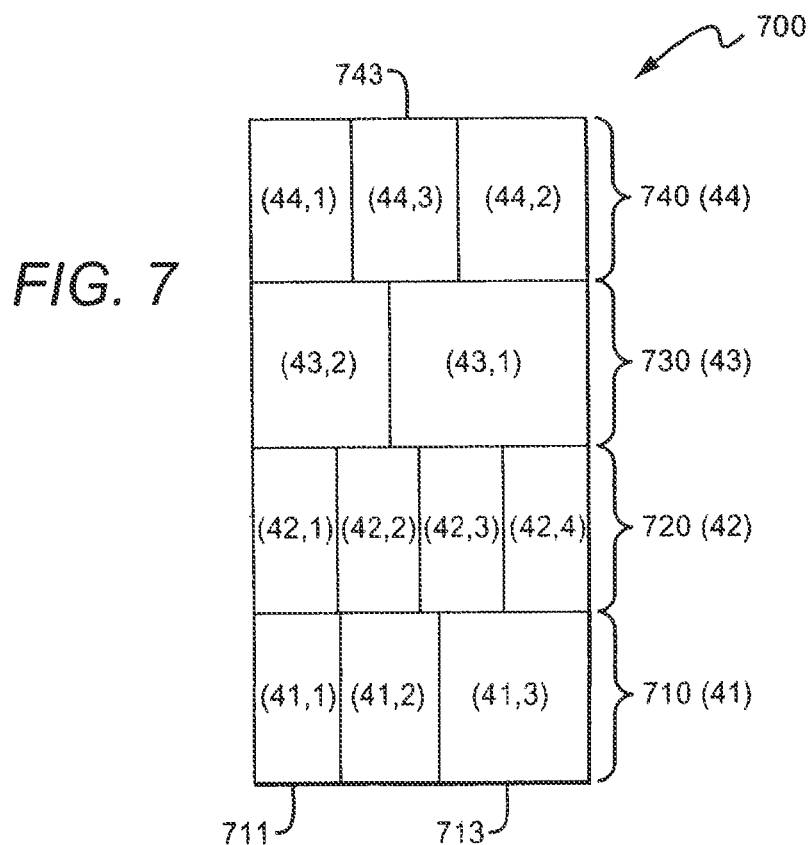

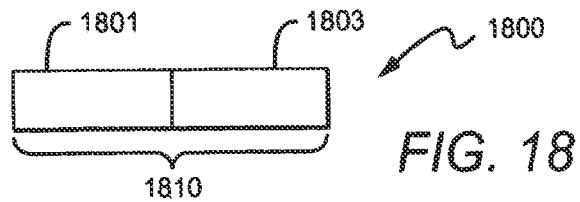
FIG. 18
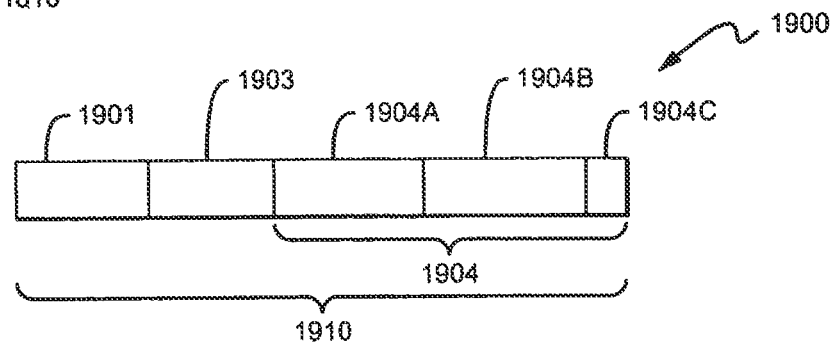
FIG. 19
FIG. 20
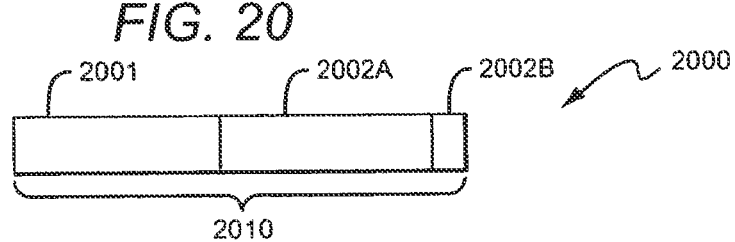
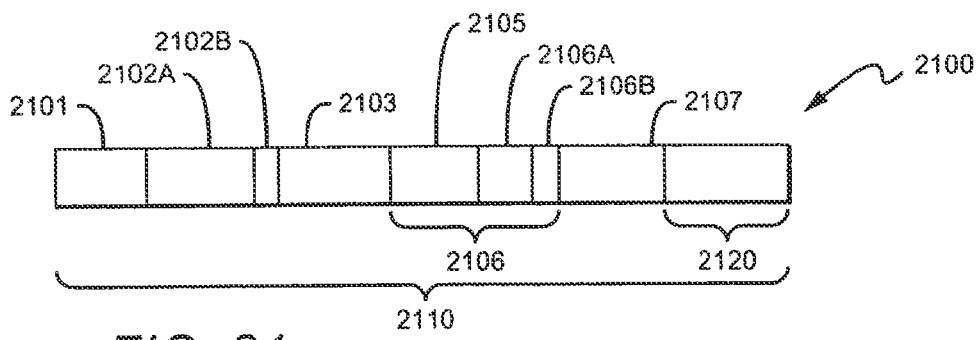
FIG. 21
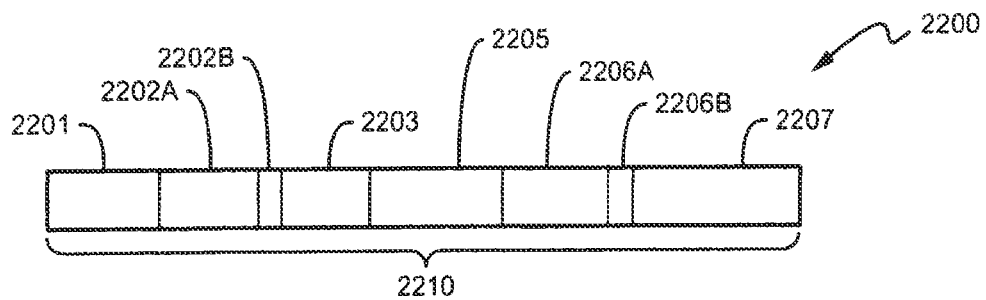
FIG. 22

LOW LEVEL STORAGE PROTOCOLS, SYSTEMS AND METHODS

CROSS-REFERENCE TO RELATED APPLICATIONS

This application is a divisional of U.S. patent application Ser. No. 11/344,874, filed on Jan. 31, 2006, which is a divisional of Ser. No. 10/473,713, filed Sept. 23, 2003, which is a national phase of PCT/US02/040205, filed Dec. 16, 2002, which claims priority to 60/425,867, filed Nov. 12, 2002, which are all incorporated herein by reference in their entirety.

FIELD OF THE INVENTION

The field of the invention is networked devices and communication protocols.

BACKGROUND OF THE INVENTION

It is well known to utilize layers of communication protocol to transmit data between devices. It is not uncommon for a protocol tasked with transmitting data to do so by adding a header to the data to form a unit, and then passing that unit on to another protocol that is generally considered to be a lower level protocol. Adding a header to the unit provided by a higher-level protocol is often referred to as encapsulating the unit. As such, it is not uncommon to talk about layers of protocols wherein units formed by higher-level protocols are encapsulated within the data portions of lower level protocols. The unit formed by a given protocol layer will often be referred to by a name that may indicate some of the characteristics of the protocol that formed the unit and/or of the unit formed. Such names include, but are not limited to, "datagram", "packet", and "frame".

A set of protocols adapted to cooperate with each other is often referred to as a suite. One common suite of protocols is the TCP/IP suite and includes, among others, the IP, TCP, and UDP protocols. The Internet Protocol (IP), defined by IETF RFC791, is the routing layer datagram service of the TCP/IP suite and is used by most of the other protocols within the suite to route frames from host to host. The IP header contains routing information and control information associated with datagram delivery. The User Datagram Protocol (UDP), defined by IETF RFC768, provides a simple, but unreliable message service for transaction-oriented services. Each UDP header carries both a source port identifier and destination port identifier, allowing high-level protocols to target specific applications and services among hosts. The Transmission Control Protocol (TCP), defined by IETF RFC793, provides a reliable stream delivery and virtual connection service to applications through the use of sequenced acknowledgment with retransmission of packets when necessary.

SUMMARY OF THE INVENTION

The present invention is directed to communication protocols and methods that facilitate communication between disaggregated elements, particularly across peer-to-peer (masterless) networks, and also to devices adapted to function as such disaggregated elements. Such devices will generally implement one or more of the methods and protocols described and will utilize network addresses to access storage areas either within themselves or within other devices. Various embodiments of the protocols and methods described herein will comprise one or more of a number of unique features. Such features include, but are not necessarily limited to packet atomicity, blind ACKs, NAT bridging, locking, multicast spanning and mirroring, and authentication.

Packet Atomicity

Packet atomicity exists for a packet if a command contained in its header can be executed without having to combine the packet with any preceding or following packets. A protocol has packet atomicity if each packet, or at least substantially all of the packets, transmitted via the protocol has/have packet atomicity. A protocol having packet atomicity will typically comprise a set of commands wherein each of the commands is autonomous and can be executed without any assumption of a previous state. In instances where a packet is being used to transfer a portion of a larger block of data, packet atomicity can be obtained by including an identifier that specifies the relative position of the data in the packet within the larger block of data.

Packet atomicity is desirable as it allows the use of connectionless communication between devices. As such, a higher level protocol having packet atomicity can be implemented on top of either a connection based protocol such as TCP, or a connectionless protocol such as UDP. Protocols having packet atomicity are also able to take advantage of features of lower level connection protocols such as the IP protocol to make features of the protocols having packet atomicity easier to implement and expand.

It is contemplated that a preferred method of achieving packet atomicity is to avoid any packet commands that operate on a larger block of data than can be contained in a single packet, and by including a unique block identifier in the header of each packet that affects data. It is also contemplated that when two devices communicate that it is advantageous to size data unit of the packet to a size equal to the smaller of the two block sizes of the devices.

It is contemplated that limiting packet data block sizes to be equal to the smallest physical block of a device a packet is being sent to will result in overall performance increases by decreasing processing time at the target even though increasing packet size has historically been a preferred method of increasing network performance.

It is also contemplated that a preferred method of communicating a block of data to a device for subsequent manipulation by the device may involve dividing the block of data into sub-blocks with the device manipulating the sub-blocks without first re-assembling the block or reordering the packets.

Devices utilizing preferred methods of communication may use a method of requesting data from a second device wherein the data on the second device is physically or logically divided into sub-units, and the requestor is only able to request a single sub-unit from the second device by providing a number such as a logical block address identifying the sub-unit requested to the storage device with the sub-unit being transmitted to the requestor in a single data packet.

Blind Ack

A blind ACK is an inherent acknowledgement of receipt of a packet. It is contemplated that limiting data transfers to data blocks that fit within a single packet and including a storage location identifier corresponding to the data block being transferred eliminates the need for an acknowledgement packet being sent. In preferred embodiments, a requesting device will initiate a transfer by sending a packet comprising an appropriate command and an identifier of a block of data to be transferred. If the requesting device subsequently receives a transfer packet comprising the identifier of the block of data to be transferred, no further action is taken. However, if after a time-out period expires the requesting device has not received such a transfer packet, it will simply re-request that the block of data be transferred. As such, the transferring device need not re-transmit data other than to satisfy additional requests, and need not receive confirmation of receipt from the requesting device. In essence, the failure of the requesting device to re-request data contained in a packet serves as an acknowledgement that the packet was received.

NAT Bridging

Preferred embodiments will support NAT Bridging, the ability to communicate through a NAT (network address translation) bridge without resorting to tunneling. As such, it is preferred that a first element be able to send a packet instructing a second element to instigate a data transfer between the second element and a third element wherein the second element and third element are separated by a bridge such as a NAT. As such, a preferred network comprises a protocol having a command to instruct two peers to communicate across a bridge, particularly when the bridge is a NAT. In an example of a preferred method, the first element may be something other than a storage element with the second and third elements being storage elements (SEs). Sending an appropriate command to the second element, a SE on the same side of a NAT as the first element, will cause the second element to initiate a data transfer with the third element, a SE on the opposite side of the NAT from the first element. In less preferred embodiments, the first element may utilize the IP address of the second element in a transfer request to the third element. In such an instance, the response by the third element may be directed by the NAT to the second element rather than back to the first element.

Locking

Preferred methods and protocols will include the ability to cause a device transferring data to a receiving device to lock the data such that the transferring device prevents modification of the transferred data until the receiving device unlocks the data.

Multicasting

Utilizing multicasting capabilities of lower level protocols (possibly with modifications) provides the ability to implement disk redundancy such as by mirroring and RAID operations, and to support disk spanning in a manner that is transparent to higher levels.

Authentication

Authentication provides the ability to reject inadvertent or malicious corruption of communication between devices such that a receiving device can absolutely authenticate that a particular packet came from a trusted source and has not been corrupted while being forwarded to the receiving device. It is contemplated that authentication is particularly important when modifying data in a device and thus some embodiments may implement authentication only in relation to commands that cause data modification.

A preferred method of transferring data to a target device via encapsulated packets will utilize encapsulated data packets comprising a data block, an identifier that maps the data block to a storage location within a storage area of the target device, and a token (or a set of tokens) that is used by the target device to determine whether to execute the command. In some instances, the method will only apply when the command to be executed is one which will cause the target device to replace the contents of the storage location with the contents of the data block of the encapsulated packet. In preferred embodiments, storage areas will be allocated to particular devices and a command will only be executed the source of the command is the device associated with any storage area affected by the command. In some embodiments, the target device may maintain a count of commands received from a particular source and stop executing commands after a certain number of commands have been received from that source.

It is contemplated that tokens may be derived using a combination of at least one of the following: MAC address of the command source, MAC address of the target device, the storage unit identifier, and the storage area identifier. Use of the storage unit and/or storage area identifier to derive the token allows a target device to verify that any such identifier has not been corrupted since the token was originally derived. Acceptance of a command as being provided by a particular source in some instance may depend in part on a calculation involving a key previously provided by the source to the target device.

It is preferred that acceptance of a particular token as authenticating the source of a command does not depend on prior or later acceptance of other tokens, and that a particular token only be useable once to authenticate a source to the target device. It is also preferred that at any given point in time, a plurality of tokens be available for authenticating that a command was received from a particular source.

External Access of Internal Storage

Devices using external network addresses to access internal storage areas (NAIS devices) are particularly well adapted to function as elements of a disaggregated component. More specifically, preferred devices implement a segmented storage model such that storage provided by such devices can be viewed as being divided into storage areas, and the storage areas into storage blocks, where each storage area is assigned a network address, and each storage block within a storage area is assigned an identifier that is unique within the storage area. Network traffic addressed with any address currently assigned to a storage area of a device will be picked up by the device and processed appropriately. As such, a single network address can be used to both route a packet across a network to a device and within the device to a particular storage area.

Preferred NAIS devices will have the capability of allocating storage areas and assigning both a name and a network address to any allocated storage area. In some instances the assigned network address will change over time while the name remains essentially constant for a particular storage area while the storage area remains allocated. It is contemplated that associating a name with any allocated storage area makes it possible to identify a storage area even if the network address associated with that storage area has changed since the storage area was allocated. On preferred networks, network addresses associated with storage areas will by dynamically assigned in a manner similar to that used to assign network addresses to network interfaces.

Disaggregation

The methods and devices described herein are particularly advantageous when the devices are elements that have been moved out of components such as personal video recorders (PVRs) and coupled to a network such that they can be shared by multiple devices. In such instances the elements, despite not having to be embedded within a component, provide the functionality of an embedded element. A "disaggregated" PVR will typically comprise a controller element and a storage element with the controller element communicating with the storage element via a network connecting the controller and storage elements, and will use network addresses to access data in a storage area allocated to the controller element.

Spanning

It is contemplated that the storage provided by a NAIS device may span multiple NAIS devices, particularly if the NAIS device is a storage device (SD), a device functioning primarily to provide storage to other devices. As an example, a first SD receiving a request to allocate storage for a device may not have sufficient capacity to satisfy the request. However, if other SD's have capacity available for use, the first SD can allocate storage on one or more of the other SD's in order to satisfy the request it first received. In some instances this will be done by the first SD controlling the other SDs such that transfers affecting the data of the SDs always pass through the first SD. In other instances multicast capabilities of the network may be used such that transfers may travel to one of the other SDs without passing through the first SD.

Mirroring

It is contemplated that mirroring and support for other forms of redundancy may be provided by having a single request be received by a plurality of NAIS SDs. In some instances, a multicast IP address may be associated with storage areas on separate SDs. Alternatively, a first SD may be instructed to watch for packets addressed to a second SD such that write requests (and possibly read or other requests) sent to the second SD are used by the first SD to mirror the data stored on the second SD. In yet another alternative, broadcast packets may be used in a similar fashion as multicast packets, but this is a less preferred option.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 5 is a schematic view of an embodiment of the SID packet of figure SID1.
FIG. 6 is a schematic view of an embodiment of the SID packet of figure SID1.
FIG. 7 is a schematic view of a storage model utilizing multi-segment addresses.
FIG. 18 is a schematic view of a ACK packet.
FIG. 19 is a schematic view of a ERROR packet.
FIG. 20 is a schematic view of a RELEASE PARTITION packet.
FIG. 21 is a schematic view of a GO TRANSFER packet.
FIG. 22 is a schematic view of a GO REQUEST packet.

DETAILED DESCRIPTION

As will be described in more detail further on, preferred protocols will comprise one or more tokened packets, split-id packets ("SID packets"), or atomic packets. A tokened packet is simply a packet that includes an authentication token. A split-id packet is a packet comprising an encapsulating and an encapsulated packet where the split-id packet also includes an identifier that is split such that a portion of the identifier is obtained from the encapsulated packet while another portion is obtained from the encapsulating packet. An atomic packet is a packet that is sufficiently self contained that any command it contains can be executed without having to first be combined with any data from past or future packets. A most preferred protocol will comprise one or more atomic, tokened, split-id packets ("ATSID packets"), i.e. packets that are atomic, tokened, and comprise a split-id.

Split-ID Packets

Figure 1:
FIG. 1 is a schematic view of a split-id packet.
Figure 2:
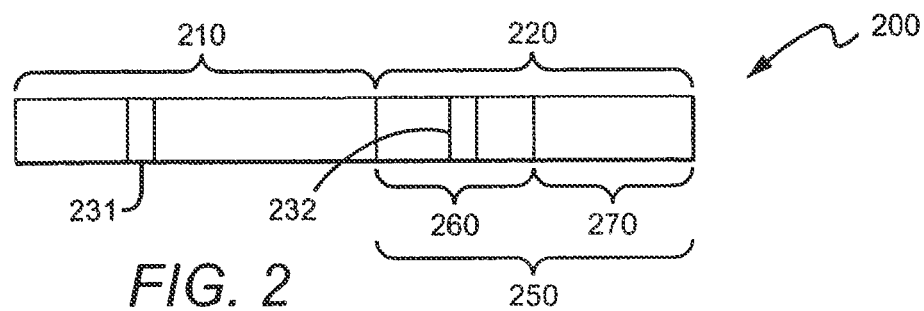
FIG. 2 is a detailed view of the split-id packet of figure SID1.

As stated above, a SID packet is a packet comprising an encapsulating and an encapsulated packet where the SID packet also includes an identifier that is split such that at least one segment of the identifier is located in the encapsulated packet while at least one other segment is located in the encapsulating packet. Referring to FIG. 1, SID packet 100 comprises a split-id ("SID") 130. In many embodiments, both the encapsulating and encapsulated packets will comprise control portions, and the SID segments will be located in those control portions. Referring to FIG. 2, SID packet 200 comprises a control portion 210 and a data portion 220 comprising a packet 250. Packet 250 comprises control portion 260 and data portion 270 with segments 231 and 232 of SID 130 being split between control portion 210 and control portion 260.

Figure 3:
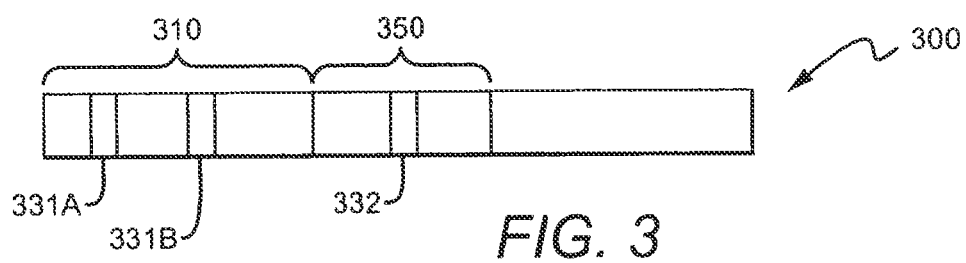
FIG. 3 is a schematic view of an embodiment of the SID packet of figure SID1.
Figure 4:
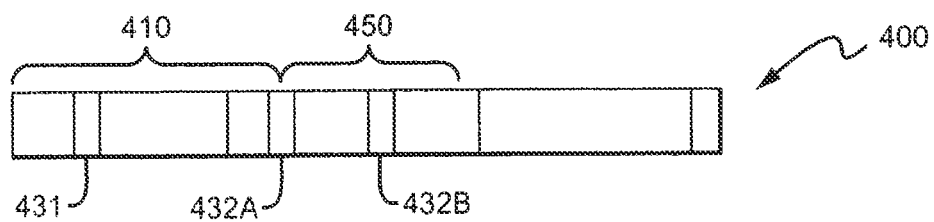
FIG. 4 is a schematic view of an embodiment of the SID packet of figure SID1.

It should be noted that a SID may comprise more than two segments. As illustrated in FIG. 3, SID 130 may comprise two or more segments in control portion 310 and a single segment in control portion 350. As illustrated in FIG. 4, SID 130 may comprise two or more segments in control portion 450 and a single segment in control portion 410. As illustrated in FIG. 5, SID 130 may comprise two or more segments in both control portion 510 and control portion 550. SID 130 may also be split among more multiple encapsulated packets. As illustrated in FIG. 6, SID 130 comprises at least three segments split among the control portions of at least three packets, with at least one segment located in each of the at least three packets.

SID packets may be advantageously used for communication between two devices that implement a storage model that in which multi-segment addresses identify storage locations. Such a storage model is depicted in FIG. 7. In FIG. 7, a storage system 700 is divided into storage areas 710-740, and each storage area is divided into storage blocks (1-3 in area 710, 1-4 in area 720, 1-2 in area 730, and 1-3 in area 740). In the model of FIG. 7, any particular storage block can be identified with a single address comprising two segments, a storage area segment and a storage block segment. One method of notating an address comprising segments X and Y is to write it in the form (X,Y). As such, block 711 would be identified by the address (41, 1), block 713 by address (41,3), and block 743 by address (44,3). When SID packets are used in conjunction with such a model, the SID may be equated to the multi-segment address. In a preferred embodiment the storage area segment would be located in the control portion of the encapsulating packet and the storage block segment would be located in the control portion of the encapsulated packet. As such, the notation used herein for multi-segment addresses could also be used for split-IDs.

It should be noted that in some embodiments model 700 will be closely tied to the physical structure of the storage device, while in other embodiments model 700 may simply be a logical constructs imposed on a system having a totally dissimilar structure. As an example of a closely tied implementation, model 700 may be used to describe the storage space of a single hard disk with storage areas 710-740 being partitions on the hard disk. In such an implementation the storage area segment of a split-ID identifying a block would likely be a partition identifier, and the storage block segment would likely be a logical block address assigned to the block within the partition. In less closely tied implementations, storage area 700 may comprise storage provided by a plurality of separate devices located in separate locations such as a storage network that includes multiple storage devices coupled together by a wide area network. The actual physical structure of storage device implementing a multi-segment storage model is generally not a concern so long as it supports multi-segment addressing and may thus advantageously use split-ID packets to communicate.

Figure 8A:
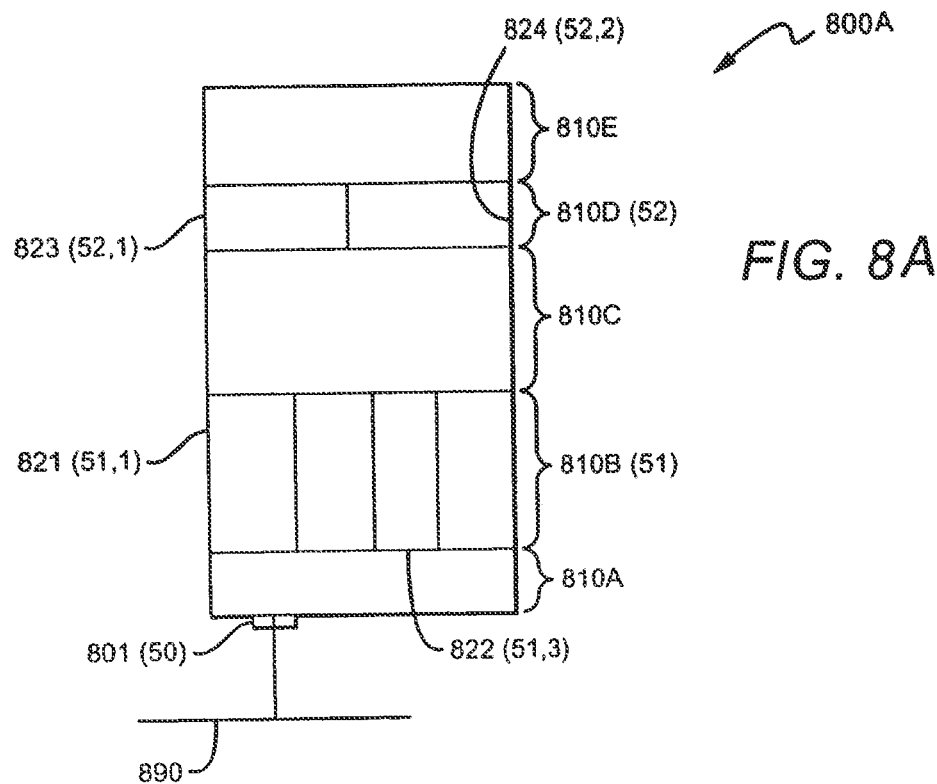
FIG. 8A is a schematic view of a storage system utilizing the model of SID4.
Figure 8B:
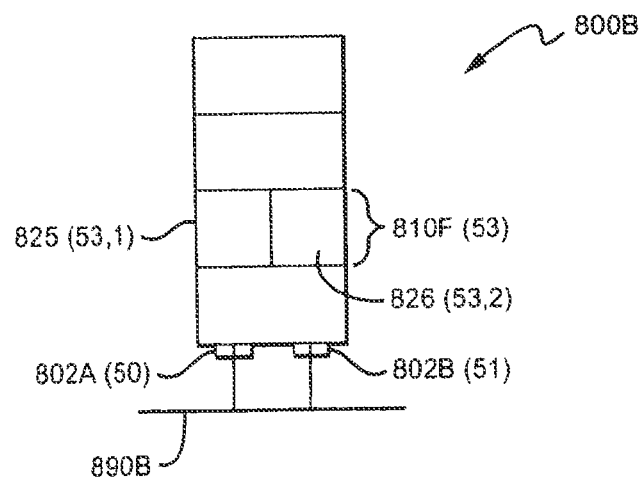
FIG. 8B is a schematic view of a storage system utilizing the model of SID4.
Figure 8C:
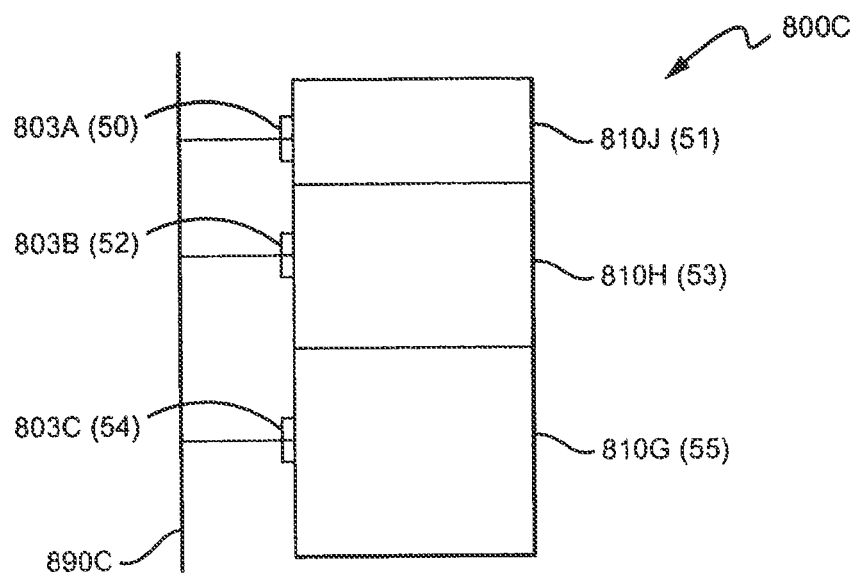
FIG. 8C is a schematic view of a storage system utilizing the model of SID4.

The use of SID packet is particularly advantageous when the storage model is implemented in a storage system coupled to a network, each storage area is assigned a network address, and the storage system is adapted to examine packets comprising network addresses assigned to storage areas within the storage system. As shown in FIG. 8, storage system 800 is coupled to network 890 via network interface 801. The storage provided by system 800 comprises allocated areas 810B and 810D, and unallocated areas 810A, 810C, and 810E. Network interface 801 is assigned network address 50. Storage area 810B is assigned network address 51. Storage area 810D is assigned network address 52. Storage block 821 is identified by the ID (51,1), block 822 by ID (51,3), block 823 by ID (52,1), and block 824 by ID (52,2). Thus, storage system 800 is assigned three network IDs, two of which are assigned to storage areas. Any packet having a destination address of 50, 51, or 52 should be examined by system 800 with packets addressed to addresses 51 and 52 being used to manipulate the contents of storage areas 810B and 810D respectively. In alternative embodiments, a storage system may comprise multiple connections to a network as shown in FIGS. 8B and 8C. In 8B, system 800B is coupled to network 890B via network interfaces 802A and 802B. Network address 50 is a assigned to interface 802A, address 51 to 802B, and address 53 to allocated storage area 810F. Block 825 is identified by ID (53,1) and block 826 by ID (53,2). In 8C, system 800C is coupled to network 890C via network interfaces 803A, 803C, and 803C and has three allocated storage areas, 810G, 810H, and 810J and six network addresses 50-55. Network address 50 is assigned to interface 803A, 52 to 803B, 54 to 803C, 51 to storage area 810J, 53 to storage area 810H, and 55 to 810G. It should be noted that in FIG. 8C there is a one network interface for each network storage area. Although such an embodiment is a less preferred one, in such an instance a single address may assigned to each combination of interface and storage area such that addresses 51, 53, and 55 are not needed.

It should be noted that the storage systems 800A, 800B, and 800C uses network addresses to access internal storage areas. Devices using network addresses to access internal storage areas (NAIS devices) are not limited storage systems and devices. As an example, a NAIS device such as a digital camera may simply comprise internal memory that is being made accessible to other devices. Although it contains storage, the primary purpose of digital camera is not to provide storage to other devices and, because of the limited amount of memory it has, would typically not function well in that capacity. However, if the camera is a NAIS device, another device may be able to access and/or manipulate the contents of the storage within the camera sing the methods described herein.

Figure 9:
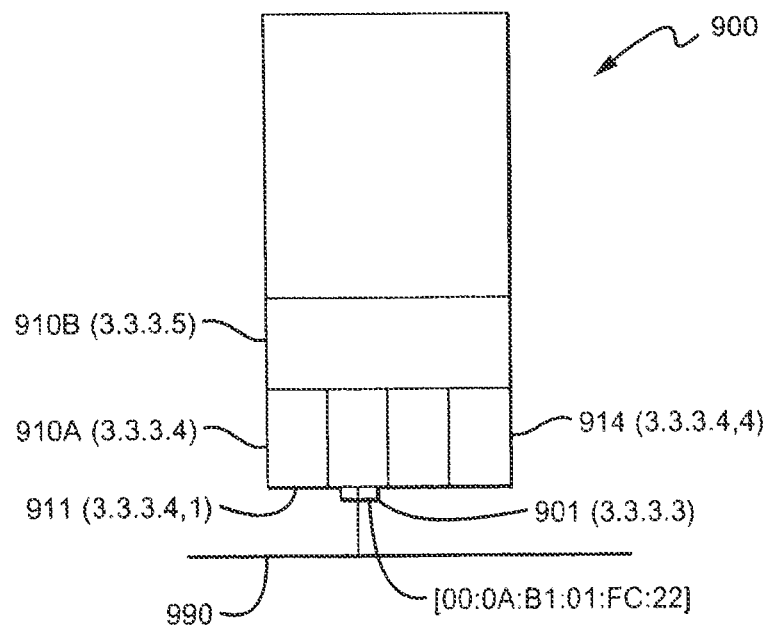
FIG. 9 is a schematic view of a storage system on an IP network.

It is currently contemplated that the use of SID packets is most advantageous when the storage model is implemented in a NAIS device such as a storage system coupled to an IP network, and the network addresses assigned to storage areas are IP addresses. In FIG. 9 storage system 900 comprises network interface 901 and allocated storage areas 910A and 910B, and is coupled to IP network 990. Network interface 901 is assigned MAC address 00:0A:B1:01:FC:22 and IP address 3.3.3.3. Storage area 910A has been assigned IP address 3.3.3.4, and are 910B address 3.3.3.5. Storage block 911 is identified by the ID (3.3.3.4, 1), and block 914 by ID (3.3.3.4,4). For storage devices stored on IP networks the network address of the network interfaces and/or the storage areas may be dynamically allocated. As an example a network address server such as a DHCP server can be used to dynamically allocate IP addresses.

In some instances, a storage model may comprise three or more levels of segregation and use an ID comprising three or more segments to identify a particular storage block. In such instances, if the network supports an addressing hierarchy, that hierarchy may be partially or fully applied to identify blocks in a similar fashion. As such, a device coupled to a network on which IP and UDP packets are used might assign IP addresses to sets of storage areas and UDP port numbers to each storage area within a set of storage areas. Alternatively, a single IP address might be viewed as comprising four segments, each segment helping to identify a particular storage area in a similar fashion to how TP addresses may be used to identify devices within subnets.

In some embodiments the portions of a protocol that relate to split-ID packets act as extensions to the protocol of the encapsulating packet as a split-id requires that the control portions of both the encapsulating and encapsulated packets be available to determine the value of the split-id. This is particularly true when the control portions of packets are implemented as headers and are followed by the data portion of the packet such that the header of the encapsulated packet immediately follows the header of the encapsulating packet. It is contemplated that in some embodiments a multi-segment address may be used to identify storage locations where the multi-segment address is part of the control portion of a single packet such as an IP packet. As such, the same memory model and multi-segment addressing may be implemented by adding the storage block identifier to the header of an IP packet where the destination address portion of the IP header is an IP address assigned to a storage location.

Tokened Packets

Figure 10A:
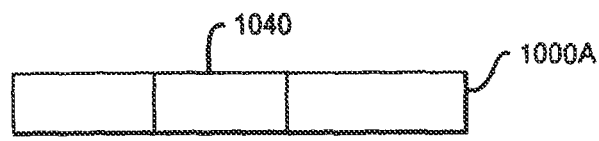
FIG. 10A is a schematic view of a tokened packet.
Figure 10B:
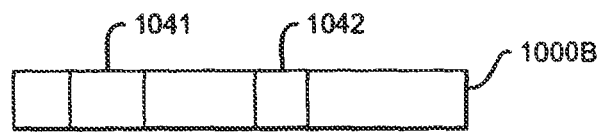
FIG. 10B is a schematic view of a tokened packet.
Figure 10C:
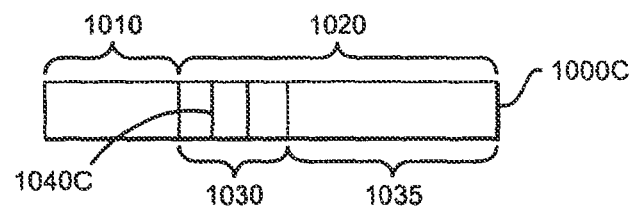
FIG. 10C is a schematic view of a tokened packet with the token in the control portion of an encapsulated packet.

As stated above, a tokened packet is simply a packet that includes an authentication token where an authentication token is a value or set of values used to authenticate the source of the packet and/or at least some of the contents of the packet. FIG. 10A illustrates a tokened packet 1000A comprising token 1040. FIG. 10B illustrates a tokened packet 1000B comprising at least two token segments 1041 and 1042. In preferred embodiments, the token will be part of the control portion of an encapsulated packet as shown in FIG. 10C. In FIG. 10C packet 1000C comprises control portion 1010 and data portion 1020. Data portion 1020 comprises an encapsulated packet having a control portion 1030 and a data portion 1035, and token 1040C is positioned within control portion 1030.

It is preferred that authentication tokens be generated using one or more algorithms and/or data values in a manner likely to prevent unauthorized devices from generating tokens that will cause invalid packets to be accepted as valid. Invalid packets are packets originating at a source other than a source identified in a token ("false packets"), or comprising data values that appear to have been provided by the source but that are not values included in the packet by the source identified in the token ("corrupted packets"). In some embodiments tokens may be an encrypted set of data that is decrypted using a key previously provided by the source. In other instances portions of the packet being validated may be used as a key for decrypting the token. It should be noted that other encryption mechanisms or unencrypted tokens may also be used. As an example, in a less preferred embodiment a token may simply comprise an unencrypted data string that a device receiving a packet has been told to associate with a source device. If the token matches the data string previously provided to the destination device, the packet is accepted as valid.

Atomic Packets

As stated above, an atomic packet is a packet that is sufficiently self contained that any command it contains can be executed without having to first be combined with any data from past or future packets. Atomicity is obtained herein by limiting data transfers to single storage blocks and including a position identifier in any packet used to transfer a storage block.

ATSID Packets

As stated above, an ATSID packet is a packet that is atomic, tokened, and comprises a split-id, and the prior discussions relating to atomic, tokened, and split ID packets generally apply to ATSID packets. It is contemplated that ATSID packets are particularly advantageous when applied to data transfer packets such as those that comprise a command instructing a device to replace the contents of a data block with the contents of the data portion of the packet, or packets generated in response to a request for data from another device. In either instance it is preferred that an ATSID packet be used to transfer the data. As described in relation to the preferred embodiments above, an ATSID packet will comprise a first packet encapsulating a second packet wherein a token is included in the control portion of the encapsulated packet and a multi-segment address is split between the control portion of the encapsulating packet and the control portion of the encapsulated packet.

PSAN Protocol

A preferred storage area network ("SAN") protocol comprises combinations of ATSID packets, tokened packets, split-ED packets, and also comprises the features described above such as packet atomicity, blind ACKs, NAT bridging, locking, multicast spanning and mirroring, and authentication. Referred to herein as the "PSAN protocol", it is preferred that the PSAN protocol comprise several sub-protocols such as a Block Transfer protocol, and a Name Resolution Broadcast Protocol. The PSAN sub-protocols can be viewed as sets of rules to be applied in the formation and interpretation of packets as well as the software and/or hardware used by a particular device to carry out those rules when communicating with other devices. In some instance a device may implement only a subset of the PSAN sub-protocols.

Figure 11:
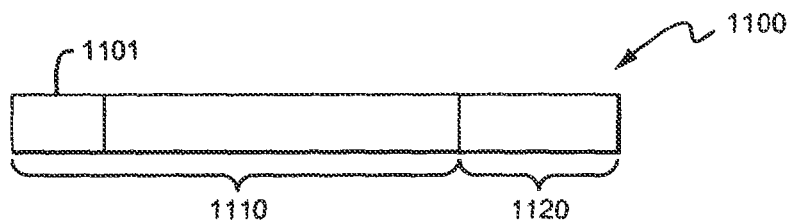
FIG. 11 is a schematic view of a PSAN packet.

The PSAN protocol is preferably implemented in a fashion wherein packets 1100 (see FIG. 11) formed in accordance with the PSAN protocol ("PSAN packets") comprise a control portion 1110 and possibly a data portion (data portion 1120 in the embodiment of FIG. 11), the control portion 1110 being implemented as a header followed, if applicable, by the data portion 1120. The control portion of each PSAN packet comprises a command 1101 that identifies the format of the rest of the control portion of the packet and the function of the packet. In preferred embodiments, the command value comprises the first bits of a packet, and, more preferably, the first byte (8 bits) of the packet, but alternative embodiments may position the command value differently.

In some instances, the command 1101 may be said to be "executed" in that a receiving device will evaluate the value of the command and, based on that value, execute an equivalent instruction or set of instructions. As such, a packet may be referred to as a command as it is treated as a command to a receiving device to take a particular action or set of actions.

As the format of the control portion of a particular packet can be determined based on the command value it contains, the contemplated formats described herein will be referred to by reference to the corresponding command value, or, more accurately, the name assigned to the corresponding command value. The following table (Table 1) identifies preferred values for a preferred set of commands:

TABLE 1

| Command Name | Value (Decimal) | Value (Hex) | Value (Binary) |
|---|---|---|---|
| TRANSFER | 1 | 01 | 0000 0001 |
| REQUEST | 2 | 02 | 0000 0010 |
| REQUEST LOCK | 3 | 03 | 0000 0011 |
| ACK | 4 | 04 | 0000 0100 |
| ERROR | 8 | 08 | 0000 1000 |
| RELEASE PARTITION | 15 | 0F | 0000 1111 |
| GO TRANSFER | 17 | 11 | 0001 0001 |
| GO REQUEST | 18 | 12 | 0001 0010 |
| GO REQUEST LOCK | 19 | 13 | 0001 0011 |
| FIND | 128 | 80 | 1000 0000 |
| FIND RESPONSE | 128 | 81 | 1000 0001 |

TABLE 1-continued

| Command Name | Value (Decimal) | Value (Hex) | Value (Binary) |
| --- | --- | --- | --- |
| NAME RESOLUTION REQUEST | 144 | 90 | 1001 0000 |
| NAME RESOLUTION RESPONSE | 145 | 91 | 1001 0001 |
| SET MULTICAST IP | 9 | 09 | 0000 1001 |
| RELEASE MULTICAST IP | 10 | 0A | 0000 1010 |
| SET LBA OFFSET | 11 | 0B | 0000 1011 |

It is contemplated that some embodiments of the PSAN protocol may consist essentially or entirely of the commands listed in Table 1 although the actual values for the commands may differ from those shown.

Figure 12:
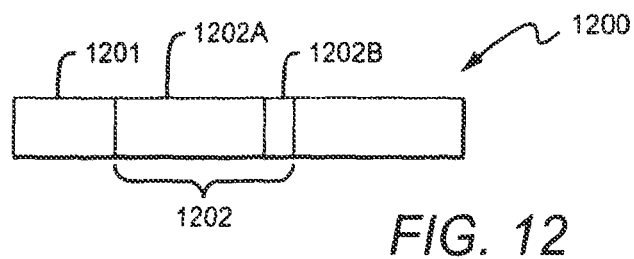
FIG. 12 is a schematic view of a Tokened PSAN packet.
Figure 13:
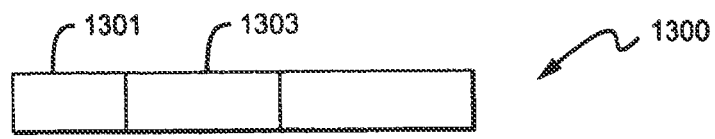
FIG. 13 is a schematic view of a Split-ID PSAN packet.
Figure 14:
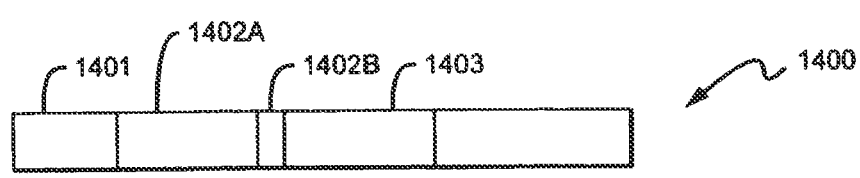
FIG. 14 is a schematic view of a Tokened, Split-ID PSAN packet.

A majority of the PSAN packets will be tokened and/or split-ID packets as shown in FIGS. 12-14. In FIG. 12, a packet 1200 comprises a command 1201, and an authentication token 1202. In preferred embodiments, token 1202 comprises and ASCII 1202A followed by a delimiter 1202B. In FIG. 13, a packet 1300 comprises a command value 1301 and a segment of a split-ID 1303. In FIG. 14, a packet 1400 comprises a command value 1401 and both a token (1402A and 1402B) and a segment of a split-ID 1403:

In preferred embodiments, PSAN packets will be encapsulated within lower level protocol packets such as IP-UDP or IP-TCP packets, and a second segment of any PSAN split-ID packet will comprise the network address of the encapsulating packet. In a most preferred embodiment, the second segment of a split-ID packet will comprise the destination IP-address of an encapsulating IP packet.

In preferred embodiments the storage blocks of a storage area of a device will be sequentially numbered in a manner similar to the use of logical block addresses ("LBAs") in disk partitions, and the segment 1403 will comprise the equivalent of the LBA of the storage block within its storage area. As such, segment 1403 may be referred to herein as a "LBA", but in such instances it should be kept in mind that segment 1403 may be any identifier that, in conjunction with a segment found in an encapsulating packet, uniquely identifies a storage block. Since the network address will, in preferred embodiment comprise and IP-address, the segment of a split-ID found in an encapsulating packet may be referred to herein as an IP-address, but it should be kept in mind in such instances that the segment located in an encapsulating packet may be any identifier that, in conjunction with segment 1403, uniquely identifies a storage block.

PSAN Protocol—Block Transfer

The PSAN Block Transfer protocol consists essentially of a TRANSFER command, a REQUEST command, a REQUEST LOCK command, a RELEASE PARTITION command, an ACK command, and an ERROR command. In preferred embodiments, the PSAN Block Transfer protocol will also comprise a corresponding set of "GO" commands that are used to cause another device to transmit TRANSFER, REQUEST, and REQUEST LOCK commands to a third device. The GO commands are GO TRANSFER, GO REQUEST, and GO REQUEST LOCK. Embodiments that support multicast will also comprise a SET MULTICAST IP command, a RELEASE MULTICAST IP command, and a SET LBA OFFSET command. In preferred embodiments, the value of each command will correspond to the values of Table 1.

Figure 15:
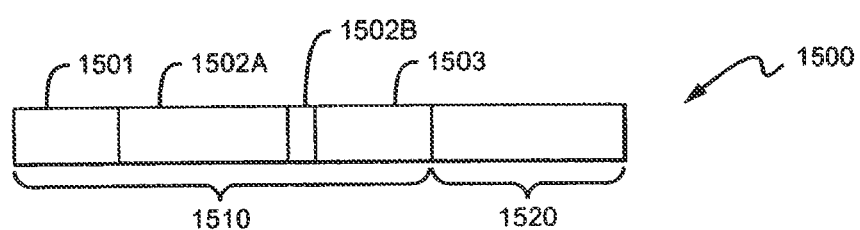
FIG. 15 is a schematic view of a TRANSFER packet.

A preferred TRANSFER packet 1500 comprises, as shown in FIG. 15, both a control portion 1510 and a data portion 1520. The control portion comprises a command 1501, token (1502A and 1502B) and an LBA 1503. The TRANSFER packet is used to transfer data either as a "write" to a device, or to respond to a REQUEST packet. Encapsulated PSAN TRANSFER packets are ATSID packets as they contain a token, a split-ID, and are atomic as the command of the packet is applied only to data contained within data portion 1520 of the packet making TRANSFER packets ATSID packets.

Whether generated as an initial write or as a response to a request, executing a TRANSFER command has the same effect, i.e. replacing the contents of a storage location on the receiving device with the contents of the data portion 1520 of the packet. A PSAN TRANSFER command is preferably limited to a single storage location, and to include all the data affecting that storage location. As such, the TRANSFER command does not depend on any other packets for execution. Transfers involving multiple storage blocks, even if the blocks are sequential, are accomplished through the use of multiple transfer commands/packets, one packet per storage block.

When a TRANSFER command is sent from a first device to a second device it is advantageous to size data portion 1520 to be equal to the smaller of the two block sizes of the devices. Limiting packet data block sizes to be equal to the smallest physical block of a device a packet is being sent to will often result in overall performance increases by decreasing processing time at the target even though increasing packet size has historically been a preferred method of increasing network performance. In instances where the physical block size differs between two communicating devices, communicating a block of data to a device for subsequent manipulation by the device may involve dividing the block of data into sub-blocks with the device manipulating the sub-blocks without first re-assembling the block or reordering the packets.

It should be noted that the data portion of the transfer back is sized smaller than the maximum allowable size for a data packet would otherwise permit. Decreasing the data block size may result in increased performance by eliminating processing on either one or both the transferring a receiving device, and/or eliminating time spent waiting for additional packets to be received.

In a preferred embodiment a TRANSFER command comprising a "0" value LBA is used to allocate a storage area to a device, the storage area being generally reserved to a device (a "client") until the device issues a RELEASE PARTITION command. Once allocated a storage area is preferably inaccessible to any device that cannot provide a token authorizing its access such that a device requesting that a storage area be allocated controls access to the allocated partition. In some instances allocation need not require a validation of the source of the packet and as such, the token may comprise a NULL value. In preferred embodiments, the data portion of the TRANSFER command being used to allocate a storage area will comprise a Name, Token, ID Character String, Authentication Tags, Partition Size, and Personality Tags.

The Name is preferably a character string or other unique identifier to be associated with an allocated storage area in addition to any associated IP Address. It is preferred that IP addresses by dynamically allocated to storage areas. As such, accessing a storage area will generally first required identifying the IP address associated with that storage area. By specifying a Name when requesting allocation of a storage area, the specified name can be used at a later time to determine the IP address associated with that storage area even if the IP address is not the IP address originally associated with the storage area.

The token is a token as previously described in regard to tokened packets. The ID Character String is a public partition name that is used to provide descriptive text in allocation status responses. The Authentication Tags are a set of tags used to define the type of authentication to be enforced on the allocated storage area. The Partition Size is simply the amount of storage that a device is requesting be allocated. The Personality Tags are a set of values that establish various options provided by a storage device for an allocated storage area such as write-once partitioning or bandwidth allocation.

Figure 16:
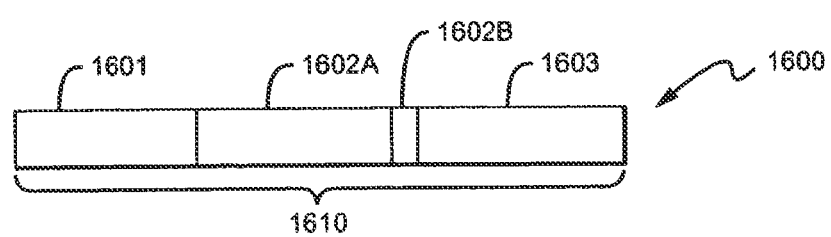
FIG. 16 is a schematic view of a REQUEST packet.

A preferred REQUEST packet 1600 comprises, as shown in FIG. 16, a control portion 1610. The control portion comprises a command 1601, token (1602A and 1602B) and an LBA 1603. A REQUEST command is used by a sending device to request that a receiving device transfer the contents of the data block identified by the LBA and the IP address provided as the destination address of the encapsulating IP packet be transferred to the requesting/sending device. A device receiving a REQUEST packet responds with a TRANSFER packet.

It should be noted that receipt of a TRANSFER packet comprising the same LBA as a REQUEST packet acts as an acknowledgement that the REQUEST packet was received. Similarly, the device that received the REQUEST packet and sent the TRANSFER packet need not receive an ACK packet from the source of the REQUEST as failure to receive a requested packet can be dealt with by re-sending the REQUEST packet. As such, in preferred embodiments a REQUEST will be resent if a corresponding TRANSFER packet (i.e. having the same LBA) is not received within some time period.

In a preferred embodiment a REQUEST command comprising a "0" value LBA is used request that a device report is capabilities. In preferred embodiments any response to such a request will comprise one or more of the following: Version, Total Capacity, Available Capacity, Speed, Reliability, Portability, and QoS Capability. In some instances status requests need not require a validation of the source of the packet and as such, the token may comprise a NULL value.

In a preferred embodiment a REQUEST command comprising a "1" value LBA and a NULL token is used to request that a device report the characteristics of a storage area. In preferred embodiments any response to such a request will comprise one or more of the following: ID Character String, and Size where the Size is the size of the allocated storage area and the ID Character String is the public character string provided as part of the allocation request.

Figure 17:
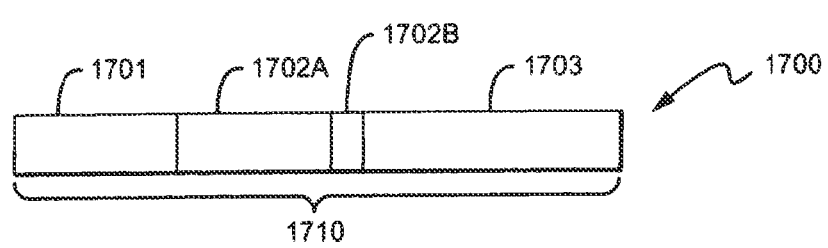
FIG. 17 is a schematic view of a REQUEST LOCK packet.

A preferred REQUEST LOCK packet 1700 comprises, as shown in FIG. 17, a control portion 1710. The control portion comprises a command 1701, token (1702A and 1702B) and a LBA 1703. Receipt of a REQUEST LOCK packet instructs a device to both transfer the contents of a particular storage block (as with a REQUEST packet), and to "lock" its contents, i.e. to prevent any subsequent access to the storage block until a TRANSFER command is received from the device that requested the lock, or until after a time out occurs. If a subsequent request from the same requesting device for the same storage block is received, any timer counting down the time out period is reset such that the second request essentially initiates a new lock request. In some instances a lock may be released by a subsequent receipt of a REQUEST (not a REQUEST LOCK) command for the same storage block from the device that requested the lock. In some instances a REQUEST LOCK may lock an entire storage area and not just a single storage block.

A preferred ACK packet 1800 comprises, as shown in FIG. 18, a control portion 1810. The control portion comprises a command 1801, and a LBA 1803. This command acknowledges a successful transfer and need only be used when a TRANSFER command is not issued in response to a REQUEST command. In such instances receipt of a TRANSFER command is essentially and instruction to write the contents of the data portion of the packet into the identified storage block. Once that process is complete, an ACK message can be sent to the source of the TRANSFER command to communicate that the command has been executed.

A preferred ERROR packet 1900 comprises, as shown in FIG. 19, a control portion 1910. The control portion comprises a command 1901, a LBA 1903, and an error message 1904 that comprises an error code 1904A, a text message 1904B, and a delimiter 1904C. An ERROR packet is used to indicate that a requested operation could not be completed for some reason and is generally sent in place of an ACK or a TRANSFER command in response to a REQUEST or a TRANSFER command. The following error messages may advantageously be implemented in any preferred embodiment:

TABLE 2

| Text | Code (Decimal) | Code (Hex.) | Code (Binary) |
|---|---|---|---|
| Invalid Authorization | 1 | 01 | 0000 0001 |
| Partition has locked you out | 2 | 02 | 0000 0010 |
| Go Command had an Invalid Authorization as to the destination | 4 | 04 | 0000 0100 |
| Go Command was locked out of partition at the destination | 8 | 08 | 0000 1000 |
| LBA is out of Range | 16 | 10 | 0001 1010 |
| LBA is Write Protected | 32 | 20 | 0010 0100 |

In some instances an embodiment of the PSAN protocol may consist essentially, or possibly only, of the messages listed in Table 2.

A preferred RELEASE PARTITION packet 2000 comprises, as shown in FIG. 20, a control portion 2010. The control portion comprises a command 2001 and a token (2002A and 2002B). The RELEASE PARTITION command will generally be issued by a device that previously requested that a partition be allocated using a TRANSFER COMMAND as described above. Executing a RELEASE PARTITION command will generally involve erasing any data contained in the storage area, releasing the LP address associated with that storage area, and otherwise making the storage blocks within the storage area available for future allocation.

It is preferred that one device be capable of requesting data transfers to occur between two other devices, even those separated by a bridge such as a NAT bridge. As such, preferred embodiments will comprise "GO" versions of the TRANSFER, REQUEST, and REQUEST LOCK packets where the GO versions of the packets are adapted to provide the information a $2^{nd}$ device would require to initiate a transfer with a $3^{rd}$ device.

A preferred GO TRANSFER packet 2100 comprises, as shown in FIG. 21, a control portion 2110 and a data portion 2120. The control portion comprises a command 2101, a token (2102A and 2102B), a split-ID segments 2103, 2105, and 2107, and a second token 2106. The split-ID segments 2103 and 2107 are LBAs, and the segment 2105 is an IP address of a storage area on a third device to be used with LBA 2107 to identify a storage block on the third device. LBA 2103 is coupled with the destination IP address of the GO TRANSFER packet to identify a storage block within a particular storage area on a $2^{nd}$ device that receives the GO TRANSFER packet. Upon receipt of a GO TRANSFER packet from a $1^{st}$ device, a $2^{nd}$ device sends a TRANSFER command that essentially writes the contents in the block identified by LBA 2103 to the block identified by IP address 2105 and LBA 2107, with the second token 2106 authorizing such a write.

A preferred GO REQUEST packet 2200 comprises, as shown in FIG. 22, a control portion 2210. The control portion comprises a command 2201, a token (2202A and 2202B), a split-ID segments 2203, 2205, and 2207, and a second token (2206A and 2206B). The split-ID segments 2203 and 2207 are LBAs, and the segment 2205 is an IP address of a storage area on a third device to be used with LBA 2207 to identify a storage block on the third device. LBA 2203 is coupled with the destination IP address of the GO REQUEST packet to identify a storage block within a particular storage area on a $2^{nd}$ device that receives the GO REQUEST packet. Upon receipt of a GO REQUEST packet from a $1^{st}$ device, a $2^{nd}$ device sends a REQUEST command requesting that the block identified by IP address 2205 and LBA 2207, with the second token (2206A and 2206B) authorizing such a request, be transferred to the $2^{nd}$ device which will use the transferred data to replace the contents of the block identified by LBA 2203 and the destination IP address of the GO REQUEST packet.

Figure 23:
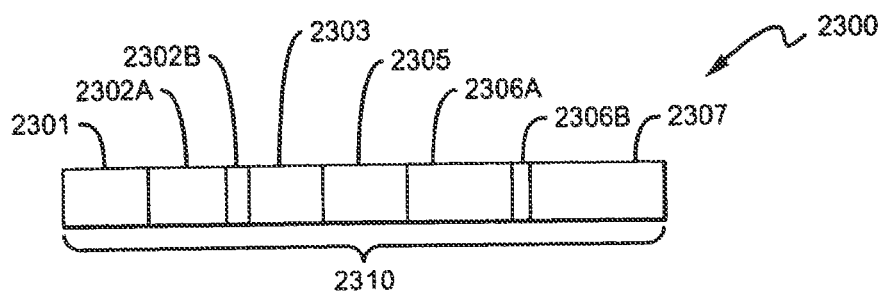
FIG. 23 is a schematic view of a GO REQUEST LOCK packet.

A preferred GO REQUEST LOCK packet 2300 comprises, as shown in FIG. 23, a control portion 2310. The control portion comprises a command 2301, a token (2302A and 2302B), a split-ID segments 2303, 2305, and 2307, and a second token (2306A and 2306B). This packet is used in the same fashion as a GO REQUEST packet but provides the additional features found in a REQUEST LOCK command as previously described.

Figure 28:
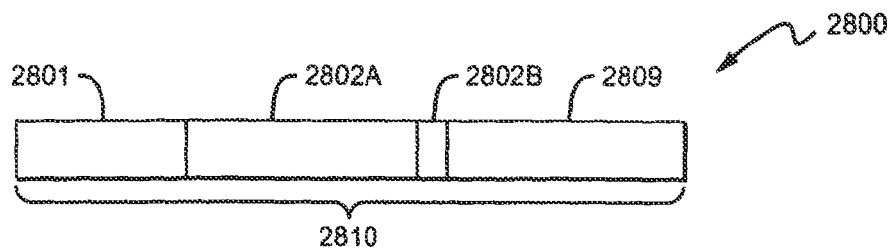
FIG. 28 is a schematic view of a SET MULTICAST IP packet.

A preferred SET MULTICAST IP packet 2800 comprises, as shown in FIG. 28, a control portion 2810 comprising a command 2801, a token (2802A and 2802B), and a multicast IP address (or some other form of multicast address) 2809. This packet is used to instruct a device that it should associate the specified multicast IP address with an allocated storage area such that packets such as TRANSFER and TRANSFER REQUEST packets comprising the assigned multicast address can access the storage area associated with the multicast address. In some instances setting a multicast IP address will prohibit the use of a unicast IP address to access a storage area associated with a multicast IP address. In other instances a storage area may be associated with both a unicast and a multicast IP address such that either address can be used to access data contained in the storage area. Upon receipt of a SET MULTICAST IP packet a device will likely issue an JP Group Management Protocol (IGMP) Join message and will subsequently respond to IGMP Queries.

Figure 29:
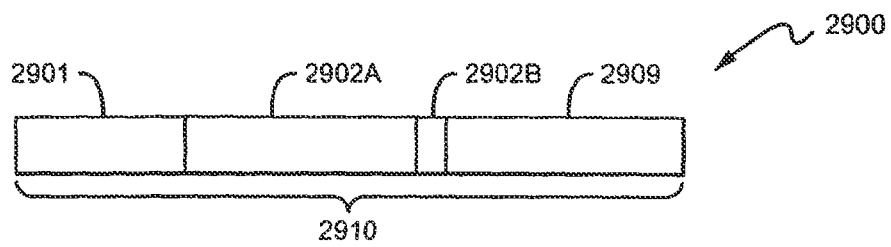
FIG. 29 is a schematic view of a RELEASE MULTICAST IP packet.

A preferred RELEASE MULTICAST IP packet 2900 comprises, as shown in FIG. 29, a control portion 2910 comprising a command 2901, a token (2902A and 2902B), and a multicast IP address (or some other form of multicast address) 2909. A device receiving this packet will disassociate the specified multicast IP address from any partition it was previously associated with.

Figure 30:
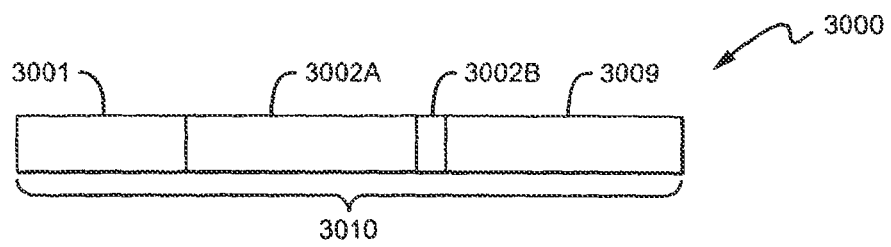
FIG. 30 is a schematic view of a SET LBA OFFSET packet.

A preferred SET LBA OFFSET packet 3000 comprises, as shown in FIG. 30, a control portion 3010 comprising a command 3001, a token (3002A and 3002B), and an LBA offset 3009. This command is used to set a LBA starting address for a storage area. Thus, where the lowest value LBAs for a storage area might otherwise be one, after receipt of this packet it would be the offset value specified.

The use of multicasting, particularly IP multicasting and the IGMP protocol as facilitated by the SET MULTICAST IP and RELEASE MULTICAST IP packets previously described, is particularly advantageous when trying to implement storage area mirroring. To mirror a first storage area onto a second storage area simply requires that both storage areas be associated with a common multicast address via the SET MULTICAST IP command. Subsequent TRANSFER commands made using that address will result in updates of the data contained in both storage areas.

The use of multicasting also advantageous when a storage device receives a request to allocate more storage than it has available. In such an instance the storage device can satisfy the request by providing the requesting device access to a virtual storage area that spans devices, in essence providing a plurality of storage areas to satisfy the request. In such an instance, the partitions to be used to satisfy the request can all be assigned a multicast IP address, and all but one can be assigned an LBA offset (via the SET LBA OFFSET command). The storage devices comprising the allocated partitions would then examine the LBA of any packets received via the multicast address, and if the LBA of the packet was in the range of LBAs assigned to a storage area it contained, use the packet as it was intended.

PSAN Protocol—Broadcast Name Resolution

Figure 24:
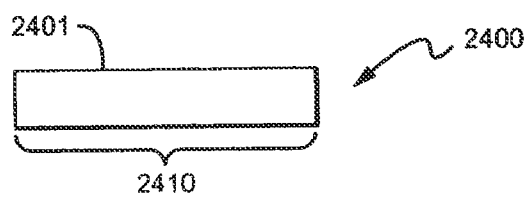
FIG. 24 is a schematic view of a FIND packet.

A preferred FIND packet 2400 comprises, as shown in FIG. 24, a control portion 2410 comprising a command 2401. This packet is issued as a broadcast request by a requesting device looking for the IP address of each accessible storage area. Any device receiving such a broadcast packet that comprises an allocated storage area should respond with one or more FIND RESPONSE packets with one FIND RESPONSE packet being sent by a device for every allocated storage area on that device.

Figure 25:
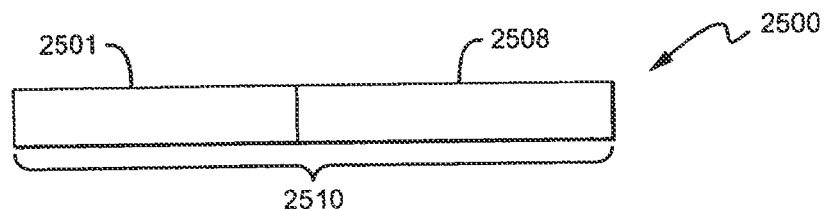
FIG. 25 is a schematic view of a FIND RESPONSE packet.

A preferred FIND RESPONSE 2500 packet comprises, as shown in FIG. 25, a control portion 2510 comprising a command 2501 and a IP Address 2508. IP Address 2508 is the IP Address assigned to a particular storage area.

Figure 26:
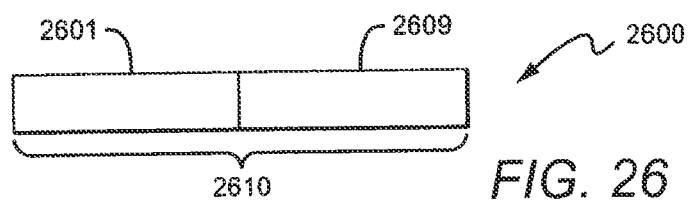
FIG. 26 is a schematic view of a NAME RESOLUTION REQUEST packet.

A preferred NAME RESOLUTION REQUEST packet 2600 comprises, as shown in FIG. 26, a control portion 2610 comprising a command 2601 and a name 2609. Any device comprising an allocated storage area assigned with the name 2609 should respond with a NAME RESOLUTION RESPONSE packet comprising the IP address currently associated with the storage area. As a result, a device that requested that a storage area be allocated can obtain the current IP address associated with that name by issuing a NAME RESOLUTION REQUEST with the name specified with the request to allocate the storage area.

Figure 27:
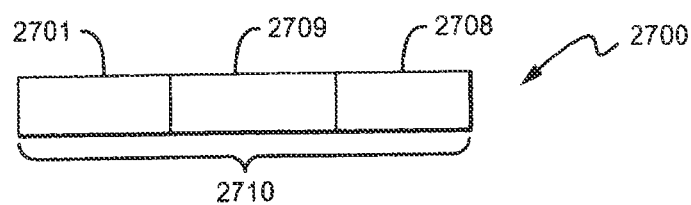
FIG. 27 is a schematic view of a NAME RESOLUTION RESPONSE packet.

A preferred NAME RESOLUTION RESPONSE packet 2700 comprises, as shown in FIG. 27, a control portion 2710 comprising a command 2701, a name 2709, and an IP address 2708. A NAME RESOLUTION RESPONSE packet is issued in response to a NAME RESOLUTION REQUEST as described above.

PSAN Protocol—Authentication

It is preferred that embodiments of the PSAN protocol support at least four, and in some instances at least five, levels of packet authentication such that a device implementing a PSAN protocol may choose one of at least six levels of security. As described herein level 0 equates to the lowest level of authentication and level 5 to the highest level of authentication. All preferred embodiments will support at least levels 0-2.

A device operating at Level 0 would accept any request from any source.

A device operating at Level 1 rejects packets that affect a storage area and are obtained from any source that is not the client that originally allocated storage area. Such a rejection must rely on the source identifiers contained in a received packet such as the source MAC or IP address contained in the packet. Use of MAC validation provides a significant level of hardware protection within a network interface card (NIC) from IP spoofing but limits flexibility as only the client will be able to access an allocated storage area. Even where access by a single device is desirable, replacement of that device will cause data loss unless a mechanism for transferring a MAC address is available. IP validation often provides less protection against spoofing as the source IP address of a packet may be more readily manipulated, but allows for simpler sharing of allocated storage areas. Unfortunately, given sufficient access to the hardware and software coupling a device spoofing of both MAC and IP addresses is possible.

A device operating at Level 2 uses rotating keys to reject accidental or malicious packets from clients who do not have the synchronization seed for the rotating key. The rotating key is a special class of keys which allow the receiver of the packets to provide a variable window of valid rotating packet keys. Once used no packet key may be used again within a single synchronization. Rotation of the keys within the sliding window occurs as each packet is acknowledged or timed out. The window nature of this schema addresses IP's unique variable time-of-flight and out of order packet flexibility. Synchronization of the receiver's rotating key window is maintained as an average moving window where the valid packets received are used to calculate the position of the receiver's window.

The use of systolic processing of the packet keys allows the client to control the length of the key and therefore the maximum instantaneous processing burden required to authenticate packet keys. Authentication is further accelerated by using the packet LBA to index into a much smaller group of keys within the sliding window.

Level 2 Rotating Key packet validation provides arguably greater protection than Level 0 or Level 1 while at the same time providing greater flexibility to share data among clients. It also addresses the special case security issues encountered in multicast packets.

New windows are created each time a client with a unique MC or IP performs a synchronization. Each unique authorization window can be configured independently in regard to window size, time-of-life and key length. Unused windows are released when they remain unused beyond their time-of-life. It should be noted that multicast receivers will each have their own window but that the parameters of the window will be identical among all members of the multicast.

Optimally the rotating key would be placed at the end of the packet so that all data is guaranteed to have been received before the valid key. This prevents malicious or accidental corruption of the data within a valid packet sent by a valid client.

A device operating at Level 3 uses rotating key and hardware MAC to reject accidental or malicious packets from clients who do not have the synchronization seed for the rotating key and are not the originating client.

Level 3 Rotating Key with the added hardware packet validation provides arguably the greatest protection from accidental and or malicious access to a device. The added level of security over Level 2 comes at the cost of sharing access among devices. This level of security is envisioned primarily for high security access between two devices.

A device operating at Level 4 adds Data Authentication Coding (DAC) to Levels 0-3 of the transport mechanism to allow the receiver to verify that the LBA and data have not been accidentally or maliciously modified in the process of transport. It is contemplated that any known or later developed DAC algorithms may be used for this purpose.

A device operating at Level 5 adds encryption of the LBA to Levels 0-4. Level 5 operations require that the LBA of a packet be encrypted through use of an algorithm in a manner similar as for Levels 3 and 4. Encrypting the LBA denies potential malicious sources from snooping LBA histograms to help focus an attack on sensitive areas of a storage area such as a portion used to store file system directories. The LBA should be encrypted using a different key and algorithm than that used for the rotating authorization key. The use of different algorithms, seeds, and keys helps prevent malicious clients from statistically decoding the authorization key using known LBA access patterns.

NAIS Storage Systems

Figure 31:
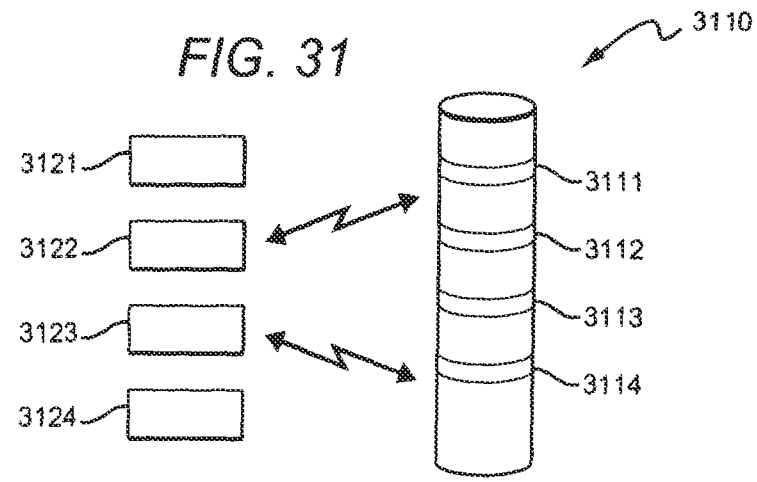
FIG. 31 is a schematic view of a shared NAIS storage device

Referring to FIG. 31, a NAIS storage system 3110 among a plurality of devices 3121-3124 coupled via a wireless network. Storage system 3110 comprises a plurality of allocated storage areas 3111-3114, each storage area being assigned an IP address and a name, and NAIS 3110 also being assigned an IP Address (sometimes referred to as the "Root IP"). NAIS storage systems are preferably adapted to handle each of the command packets of the PSAN protocol in the following manner.

A client device wishing to obtain additional storage will first identify a NAIS storage device on the network and will then send a TRANSFER request requesting that a certain amount of storage be allocated. The NAIS device will respond to the request by allocating the requested amount of storage (possibly in cooperation with other NAIS devices), obtaining an IP address to be associated with the storage, and associating both the obtained IP address and the name provided by the client with the storage. If the NAIS storage device is subsequently powered down or otherwise temporarily removed from a network, it will request replacement IP addresses when reconnected to a network. As IP addresses, may change over time, NAIS storage systems are also adapted to respond to NAME RESOLUTION REQUEST commands to allow devices to obtain the current IP addresses through the use of the names associated with allocated storage areas. NAIS storage devices are also adapted to respond to FIND requests in the manner previously described.

A client device requesting to write data to an allocated storage area of a NAIS storage device will send a TRANSFER packet comprising a split-ID made up of the IP address associated with the storage area and an LBA identifying a block within the storage area. The NAIS storage device will, upon receipt and authentication of the packet, replace the contents of the storage block identified by the split-ID with the data portion of the received TRANSFER packet and will subsequently send an ACK packet notifying the client that the transfer occurred without error, or an ERROR packet indicating that an error occurred during the transfer.

A client device desiring to obtain data from an allocated storage area of a NAIS storage device will send a REQUEST packet comprising a split-ID made up of the IP address associated with the storage area and an LBA identifying a block within the storage area. The NAIS storage device will, upon receipt and authentication of the packet, respond with a TRANSFER packet containing the contents of the requested block, or an ERROR packet indicating why the transfer could not be completed. If the client device desires to prevent modification of the requested block of data after it is transferred, the client can use a REQUEST LOCK packet in place of a REQUEST packet.

In general, NAIS storage systems should be adapted to prevent unauthorized access to allocated storage areas, and to implement at least one of the authentication levels described herein. When an allocated storage area is not needed anymore, the client can send a RELEASE PARTITION command. The NAIS devices will respond to such a command by erasing the contents of the storage area and then making the released storage available for subsequent allocation. The contents of an allocated storage area should never be accessible to any client without authorization from the allocating client. In preferred embodiments a NAIS device will be unable to access the contents of a storage area without authorization from the allocating client, and recover of storage from an allocated partition can only be achieved upon receipt of an authorized RELEASE PARTITION command, or by getting rid of all of the allocated storage areas of a NAIS storage device.

Storage Systems that Span Devices

Figure 32:
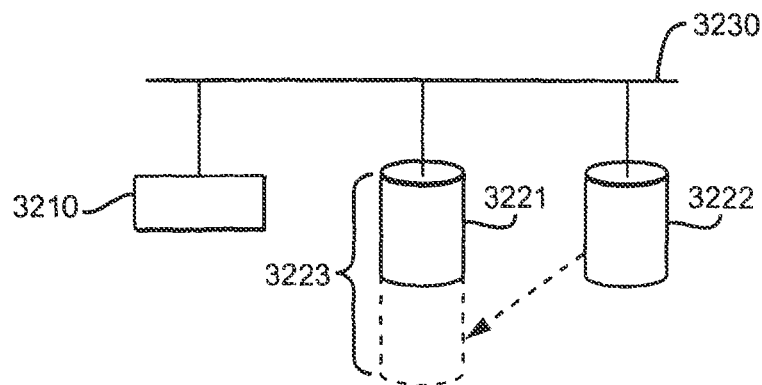
FIG. 32 is a schematic view of allocated storage spanning NAIS storage devices.

In FIG. 32, a client 3210 and NAIS storage devices 3221 and 3222 are coupled to a network 3230. Client 3210 originally requested NAIS 3221 for an allocation of storage space in excess of the space available on NAIS 3221. As such, NAIS 3221 in turn requested that the space it could not provide be provided by NAIS 3222. The fact that the storage space 3223 allocated spans NAIS devices is essentially transparent to client 3210 as the only indication it may have that such spanning occurred is if it sees that the IP address returned by NAIS 3221 is a multicast IP. Although multicasting is the preferred method for implementing spanning, methods applicable to non-NAIS storage devices can generally also be implemented via NAIS storage devices.

Storage Systems that are Mirrored

Figure 33:
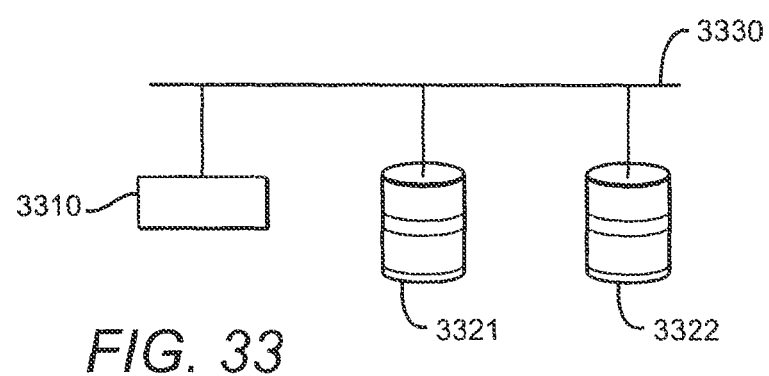
FIG. 33 is a schematic view of a mirrored NAIS storage device.

In FIG. 33, a client 3310 and NAIS storage devices 3321 and 3322 are coupled together via network 3330. In the system shown, client 3310 uses a multicast IF address to communicate with both NAIS 3321 and 3322. The initial allocation of storage areas on both NAIS devices may be done by client 3310 requesting allocation of space on both devices and then setting a multicast IP address to be used to access each of the allocated storage areas. Alternatively, NAIS 3321 may be configured such that, any request for allocation of storage space results in a corresponding request from NAIS 3321 to NAIS 3322, and a multicast IP address being returned from NAIS 3321 to client 3310.

RAID Storage Systems

Figure 34:
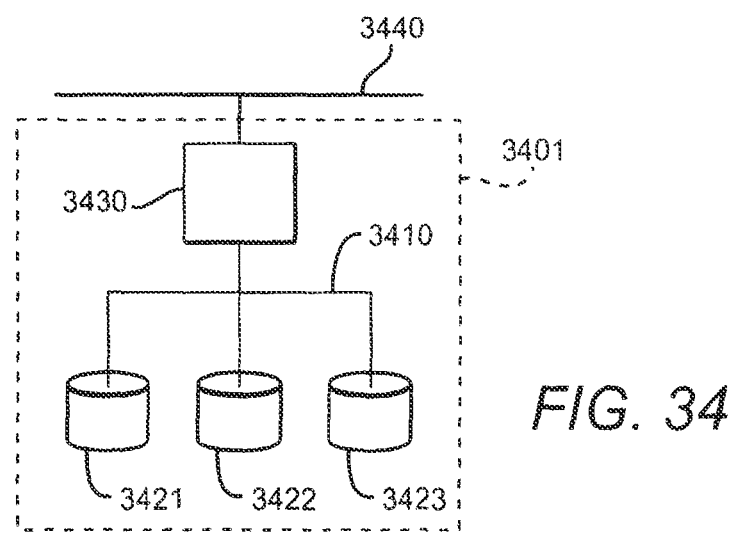
FIG. 34 is a schematic view of a RAID device implemented using NAIS storage devices.

The methods described above in regard to mirroring and spanning can be utilized to develop RAID (Redundant Array of Independent Disks) storage systems. In some embodiments, the RAID system will comprise devices that are individually accessible across a network. In other instances a RAID system may comprise a dedicated network coupling NAIS devices to a controller that makes the RAID system indistinguishable from any other NAIS device and eliminates the need for devices using the RAID system from having to utilize broadcast addresses. In such an instance the controller may simply translate the SID of incoming packets into a broadcast IP address and LBA for use on the internal network. Referring to FIG. 34, a RAID system 3401 comprises network 3410, NAIS storage devices 3421-3423, and controller 3430 coupled to a network 3440 and to network 3410. NAIS storage devices 3421-3423 have the preferred characteristics of NAIS storage devices described above.

EXAMPLE

Personal Computer Storage

Figure 35:
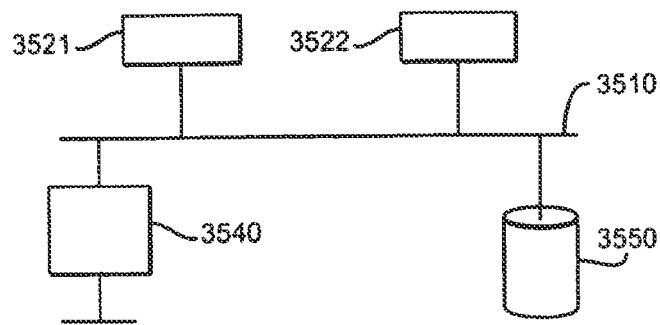
FIG. 35 is a schematic view of a PC network comprising a shared NAIS device.

Referring to FIG. 35, a system comprising network 3510, personal computers 3521 and 3522, DHCP server/NAT Bridge 3540, and NAIS storage device 3550 is shown. NAIS 3550 obtains LP addresses for allocated storage areas from DHCP server/NAT Bridge 3540. Personal computers 3521 and 3522 obtain storage from NAIS 3550 and otherwise interact with NAIS storage device 3550 using the PSAN protocol. NAIS storage devices 3550 has the preferred characteristics of NAIS storage devices described above.

EXAMPLE

Digital Still and Video Photography

Figure 36:
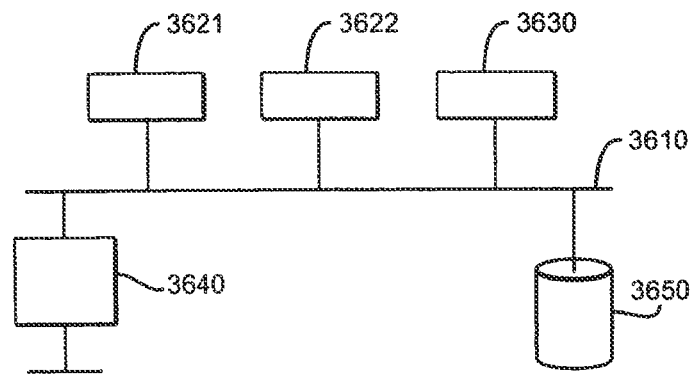
FIG. 36 is a schematic view of a home entertainment system comprising NAIS devices.

Referring to FIG. 36 a system comprising network 3610, digital camera 3621, video camera 3622, television 3630, DHCP server/NAT Bridge 3640, and NAIS storage device 3650 is shown. Cameras 362 and 3622 obtain storage from NAIS 3650 and use that storage for storing digital pictures and videos. Television 3630, upon receipt of authorization from cameras 3621 and 3622 is able to be used to view the videos and photographs contained in cameras 3621 and 3622 and/or stored on NAIS 3650. NAIS 3650 obtains LP addresses for allocated storage areas from DHCP server/NAT Bridge 3640. NAIS storage devices 3550 has the preferred characteristics of NAIS storage devices described above. PSAN packets are used by the various devices for communications and data transfer across network 3610.

EXAMPLE

Personal Video Recorders and Set Top Boxes

Figure 37:
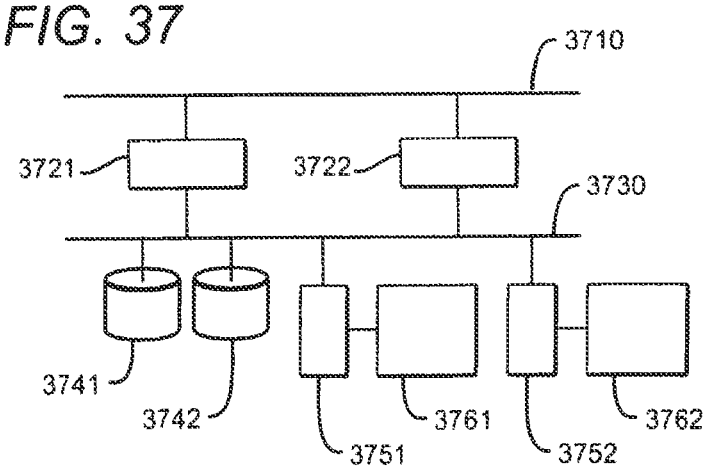
FIG. 37 is a schematic view of a digital still and video photography system comprising NAIS devices.

Referring to FIG. 37 a system comprising cable programming network 3710, tuners 3721 and 3722, IP network 3730, NAIS storage devices 3741 and 3742, decoders 3751 and 3752, and televisions 3761 and 3762 is shown. NAIS storage devices 3750 has the preferred characteristics of NAIS storage devices described above. Tuners 3721 and 3722 obtain programs broadcast on cable programming network 3710 and store any such broadcasts on NAIS storage devices 3741 and 3742. Decoders 3751 and 3752 obtain such stored broadcasts from devices 3741 and/or 3742 and display then on televisions 3761 and 3762. PSAN packets are used by the various devices for communications and data transfer across network 3710.

Characterization of Embodiments

Table 3 provides alternative and/or additional descriptions characterizing alternative embodiments that the inventive subject matter includes, but is not necessarily limited to. Each description within the table may be referenced by specifying a set and number such that description A1 is the first description in the A set. Additional details can be found in concurrently filed PCT application No. PCT/US02/40199, entitled "Data Storage Devices Having IP Capable Partitions" and PCT application No. PCT/US02/40198, entitled "Electrical Devices With Improved Communication", the disclosures of which are incorporated herein by reference.

TABLE 3

Embodiment Characterizations

| Set | No. | Description |
|---|---|---|
| A | 1 | A method of transferring data to a target device via encapsulated packets wherein each encapsulated packet comprises a data block and an identifier that maps the data block to a storage location within a storage area of the target device; and wherein the storage area of the target device is identified by an identifier contained in a header of a packet encapsulating the encapsulated packet. |
| A | 2 | The method of A1 wherein the size of the data block of each of the encapsulated packets is equal to the native block size of the target device. |
| A | 3 | The method of A1 wherein the header of the encapsulated packet comprises a command, the identifier, and a token that is used by the target device to determine whether to execute the command. |
| A | 4 | The method of A3 wherein execution of the command causes the target device to replace the contents of the storage location with the contents of the data block of the encapsulated packet. |
| A | 5 | The method of A4 wherein the token is used to authenticate the source of the command, and the command is only executed if the storage area has been allocated to the source of the command. |
| A | 6 | The method of A5 wherein the encapsulated packet comprises a plurality of tokens used to authenticate the source of the command. |
| A | 7 | The method of A5 wherein acceptance of a particular token as authenticating the source of the command does not depend on prior or later acceptance of other tokens. |
| A | 8 | The method of A5 wherein the token comprises a value that is at least partially dependent on the MAC address of the source of the command. |
| A | 9 | The method of A5 wherein the target a particular token will only be accepted once by the target device as authenticating the source of the command. |
| A | 10 | The method of A5 wherein the target device will accept a plurality of tokens as authenticating the source of the command. |
| A | 11 | The method of A10 wherein the number of tokens the target device will accept as authenticating the source of the command is statistically insignificant compared to the number tokens that the target device will not accept as authenticating the source of the command. |
| A | 12 | The method of A5 wherein the target device maintains a count of commands received from a particular source and stops executing commands after a certain number of commands have been received. |
| A | 13 | The method of A5 wherein acceptance of a command as being provided by a particular source depends in part on a calculation involving a key previously provided by the source to the target device. |
| A | 14 | The method of A5 wherein acceptance of a command as being provided by a particular source depends in part on a calculation involving a network address obtained from an encapsulating header. |
| A | 15 | The method of A5 wherein the token is used to authenticate the identifier as well as the source of the command. |
| A | 16 | The method of A5 wherein the token is used to authenticate a range of identifiers as well as the source of the command. |
| A | 17 | The method of A1 wherein executing the command causes the target device to obtain data from a third device that is neither the target device nor the source of the command. |
| A | 18 | The method of A17 wherein the source of the command provides a user with a graphical display providing control and status of transfers between the target device and the third device. |
| A | 19 | The method of A18 wherein the target device and the third device are separated by a bridge. |
| A | 20 | The method of A19 wherein the bridge is a NAT bridge. |
| A | 21 | The method of 1 wherein the storage area identifier is also used to route the encapsulating packet to the target device. |
| B | 1 | A method of transferring data to a plurality of target devices via encapsulated packets wherein each encapsulated packet comprises a data block and an identifier that maps the data block to a storage location within a storage area of each of the plurality of target devices; and wherein the storage area of each of the plurality of target devices is identified by an identifier contained in a header of a packet encapsulating the encapsulated packet. |
| B | 2 | The method of B2 wherein the storage area identifier is also used to route the encapsulating packet to each of the plurality of target devices. |
| B | 3 | The method of B2 wherein the all of the plurality of target devices share a native block size and the size of the data block of each of the encapsulated packets is equal to the native block size of the plurality of target devices. |
| B | 4 | The method of B3 wherein the header of each encapsulated packet comprises a command, the identifier, and a token that is used by each of the plurality of target devices to determine whether to execute the command. |
| B | 5 | The method of B4 wherein execution of the command causes each of the plurality of target devices to replace the contents of the storage location with the contents of the data block of the encapsulated packet. |
| C | 1 | A protocol comprising a packet used to transfer data from a first device to a second device, the packet including an identifier provided to the first device from the second device, wherein including the identifier in the packet eliminates the need for the second device to acknowledge receipt of the packet. |
| D | 1 | A method of communicating a block of data to a device for subsequent manipulation by the device wherein the block of data is divided into sub-blocks and the device manipulates the sub-blocks without first re-assembling the block. |
| E | 1 | A method of communicating a block of data to a device for subsequent manipulation by the device wherein the block of data is divided into sub-blocks and transferred out of order and the device manipulates the sub-blocks without first re-ordering the block. |
| F | 1 | A method for a requestor to request data from a storage device wherein: the data on the storage device is divided into sub-units; the requestor is only able to request a single sub-unit from the storage device; the requestor requests a single sub-unit from the storage device by providing a number identifying the sub-unit requested to the storage device; and the sub-unit is transmitted to the request in a single data packet. |
| G | 1 | A method of communicating a block of data to a device for subsequent manipulation by the device wherein the block of data is divided into sub-blocks and transferred out of order and the device manipulates the sub-blocks without first re-ordering the block. |
| H | 1 | A storage device having a media with a plurality of partitions, each of the partitions being separately addressed by at least one IP address. |

TABLE 3-continued

Embodiment Characterizations

| Set | No. | Description |
|---|---|---|
| H | 2 | A storage system comprising the storage device of H1 wherein at least one of the plurality of partitions is multicast spanned with another storage device. |
| H | 3 | A storage system comprising the storage device of H1 wherein at least one of the plurality of partitions is proxy spanned with another storage device. |
| H | 4 | The storage device of H1 wherein at least one of the plurality of partitions is proxy spanned with another of the plurality of partitions. |
| H | 5 | The storage device of H1 comprising at least two different types of storage media. |
| I | 1 | A storage device having a media with a plurality of partitions, each of the partitions being separately addressed by at least one IP address. |
| I | 2 | The device of I1 wherein at least one partition is addressed by at least two IP addresses. |
| I | 3 | The device of I2 wherein one of the at least two IP addresses is a multicast address. |
| I | 4 | The device of I1 wherein the media comprises at least one of fixed, removable, electronic, magnetic, electromechanical, optical, solid state, static, and/or rotating. |
| I | 5 | The device of I1 wherein the device comprises at least one of a floppy disk, hard disk, ram disk, storage arrays, storage network, CD ROM devices DVD device, magnetic tape device, and flash memory. |
| I | 6 | The device of I1 wherein the device comprises a plurality of media, each of the media comprising a plurality of media partitions, the device comprising at least one device partition that comprises a media partition from each of at least two media. |
| I | 7 | The device of I6 wherein the device partition comprises a plurality of storage blocks, each of the blocks being assigned an integer value within a range wherein the values of the blocks in a first of plurality of media partitions do not overlap the values of the blocks in a second of the plurality of media partitions. |
| I | 8 | The device of I1 wherein the device comprises at least two different types of media. |
| I | 9 | The device of I8 wherein each of the at least two different types of media comprises a plurality of partitions, each of the partitions being separately addressed by at least one IP address. |
| J | 1 | A system coupled to a network and adapted to examine packets on the networks to determine if they contain one of at least two network addresses wherein one of the at least two network addresses is associated with a storage area within the system. |
| J | 1B | The system of J1 wherein the system comprises a plurality of storage areas, a plurality of network interfaces, and a plurality of dynamically assigned IP addresses, and the number o assigned IP addresses is equal to or greater than the combined number of storage areas and network interface. |
| J | 1C | The system of J1B wherein system is adapted to request the IP addresses from a DHCP server. |
| J | 1D | The system of J1B wherein the system is adapted to provide an identifier other than a MAC address to the DHCP server when requesting IP addresses. |
| J | 2 | A system comprising a plurality of NAIS devices wherein at least two of the NAIS devices comprise storage areas associated with a common multicast IP address. |
| J | 3 | The system of J2 wherein the at least two NAIS devices are storage devices and one NAIS device mirrors the other NAIS device. |
| J | 4 | The system of J3 wherein the at least two NAIS devices examine packets addressed with the common multicast IP address to determine if any particular packet contains an LBA within an assigned range wherein the at least two NAIS devices each have an assigned range which does not overlap the range of any other NAIS device. |
| K | 1 | A digital still and video photography system comprising at least one NAIS storage device, at least one digital image capture device, and at least one digital image display device wherein the NAIS, the display device and capture devices are separate devices coupled together via an IP network. |
| L | 2 | The system of Z1 wherein the NAIS communicates with the display device and the capture device via the PSAN protocol. |
| M | 3 | A home entertainment system comprising a cable programming network, an IP network, a tuner coupled to both the cable network and the IP network, a NAIS storage device coupled to the IP network, a decoder coupled to the IP network, and a television coupled to the decoder wherein the tuner is adapted to extract information broadcast on the cable programming network and to use the PSAN protocol to store the extracted information on the NAIS storage device, and the decoder is adapted to obtain information from the NAIS storage device using the PSAN protocol, decode it, and transmit the decoded information to the television. |

Thus, specific embodiments and applications of communication methods and protocols, and devices utilizing external addressing of internal storage areas have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method comprising:

receiving, at a network interface associated with a first storage device, a request from a requestor over a network, the requestor being different from the first storage device and the request requesting an allocation of storage that exceeds an amount of allocatable storage of the first storage device;

allocating a first storage area on the first storage device and a second storage area on a second storage device, which is different from the first storage device, to the requestor based at least in part on the request;

assigning, based on said allocating, a network address to the first storage area and the second storage area, wherein the network address comprises an Internet protocol address to facilitate routing of a packet over the network and within the first storage device;

transmitting, to the requestor, a response that includes the network address;
receiving a packet having a first address that is the network address and a second address; and
identifying the first and second storage areas based on the first address and identifying a portion within the first and second storage areas based on the second address.

2. The method of claim 1, wherein the request is a first request and said allocating the second storage area comprises:
transmitting, to the second storage device, a second request for allocation of storage based at least in part on said receiving of the first request.

3. The method of claim 1, wherein the first storage device includes a plurality of storage areas including the first storage area and the network address uniquely identifies the first storage area among the plurality of storage areas.

4. The method of claim 1, wherein the network address is a multicast address directly associated with both the first storage area and the second storage area.

5. The method of claim 1, wherein the network address is a unicast address directly associated with only the first storage area and the method further comprises:
receiving, at the first storage device, a packet from the requestor, the packet including the network address, a logical block address (LBA) that corresponds to the second storage area, and a command; and
transmitting another packet, to the second storage device, to execute the command with respect to the LBA.

6. The method of claim 1, wherein the request includes another network address associated with a network interface of the first storage device.

7. The method of claim 1, wherein the first storage device and the second storage device are peers.

8. An apparatus comprising:
a network interface;
a first storage medium; and
a controller coupled to the network interface and the first storage medium and configured to
receive a request from a requestor via the network interface, the request requesting an allocation of storage that exceeds an amount of allocatable storage of the first storage medium;
allocate a first storage area on the first storage medium and a second storage area on a second storage medium of a storage device to the requestor based at least in part on the request, the storage device being different from the apparatus;
assign a network address to the first storage area and the second storage area, wherein the network address comprises an Internet protocol address to facilitate routing of a packet over the network and within the first storage device;
transmit, to the requestor via the network interface, a response that includes the network address;
receive a packet having a first address that is the network address and a second address; and
identify the first and second storage areas based on the first address and identify a portion within the first and second storage areas based on the second address.

9. The apparatus of claim 8, wherein the request is a first request and the controller is configured to allocate the second storage area by being configured to
transmit, to the storage device, a second request for allocation of storage based at least in part on said receipt of the first request.

10. The apparatus of claim 8, wherein the first storage medium includes a plurality of storage areas including the first storage area and the network address uniquely identifies the first storage area among the plurality of storage areas.

11. The apparatus of claim 8, wherein the network address is a multicast address directly associated with both the first storage area and the second storage area.

12. The apparatus of claim 8, wherein the network address is a unicast address directly associated with only the first storage area and the controller is further configured
to receive, via the network interface, a packet from the requestor, the packet including the network address, a logical block address (LBA) that corresponds to the second storage area, and a command; and
to transmit another packet, to the second storage medium, to execute the command with respect to the LBA.

13. The apparatus of claim 8, wherein the request includes another network address associated with the network interface.

14. The apparatus of claim 8, wherein the apparatus and the storage device are peers.

* * * * *